United States Patent [19]

Sakurai et al.

[11] Patent Number: 5,796,866
[45] Date of Patent: Aug. 18, 1998

[54] APPARATUS AND METHOD FOR EDITING HANDWRITTEN STROKE

[75] Inventors: Yasuhiro Sakurai, Osaka; Osamu Kamo, Kobe, both of Japan

[73] Assignee: Matsushita Electric Industrial Co., Ltd., Osaka, Japan

[21] Appl. No.: 351,785

[22] Filed: Dec. 8, 1994

[30] Foreign Application Priority Data

Dec. 9, 1993 [JP] Japan .................................. 5-309333

[51] Int. Cl.$^6$ .................. G06K 9/00; G06K 9/03; G06K 9/20
[52] U.S. Cl. .................. 382/187; 382/309; 382/311
[58] Field of Search .................. 382/186, 187, 382/310; 395/146; 358/280

[56] References Cited

U.S. PATENT DOCUMENTS

| | | | |
|---|---|---|---|
| 4,667,248 | 5/1987 | Kanno . | |
| 5,038,382 | 8/1991 | Lipscomb | 382/189 |
| 5,367,453 | 11/1994 | Capps et al. | 382/310 |
| 5,448,475 | 9/1995 | Senoo et al. | 382/187 |
| 5,463,696 | 10/1995 | Beernink et al. | 382/186 |
| 5,485,565 | 1/1996 | Saund et al. | 395/142 |
| 5,502,803 | 3/1996 | Yoshida et al. | 395/146 |
| 5,517,578 | 5/1996 | Altman | 382/187 |
| 5,583,946 | 12/1996 | Gourdol | 382/187 |

OTHER PUBLICATIONS

"Classification of handwritten Stroke Data into Lines", Journal of Denshi Jyoho Tsushin Gakkai, Jul. 1990, vol. J73-D-II, No. 7 (with partial translation).

Segmentation of handwritten Stroke Data into Characters, Journal of Denshi Jyoho Tsushin Gakkai, Oct. 1991, vol. J73-D-II, No. 10 (with partial translation).

"Stroke Editor, and Direct Ponting and Manipulation", Journal of Jyoho Shori Gakkai, Aug. 1991, vol. 32, No. 8 (with partial translation).

"A Trainable Gesture Recognizer", by James S. Lipscomb, Pattern Recognition Society 1991.

*Primary Examiner*—Andrew W. Johns
*Assistant Examiner*—Monica S. Davis
*Attorney, Agent, or Firm*—Price, Gess & Ubell

[57] ABSTRACT

A handwritten stroke data editing system comprising: a group management unit for managing group data and box data for each group, the group data representing strokes within one group, the box data representing a box that is circumscribed to each group, the group including at least one of a character group representing a handwritten character, a word group representing a handwritten word, a line group consisting of a plurality of handwritten characters and/or words, a figure group representing a handwritten figure, a gesture recognition unit for recognizing an editing area based on a gesture inputted by unit of a stylus, the stylus being furnished for the system, the input gesture being represented by the stroke data, the editing area including the stroke data; and a to-be-edited group selection unit for selecting a to-be-edited group by computing an overlapping area of the editing area and each box, the selected to-be-edited group having the overlapping area more than a predetermined ratio to an area of the box. The to-be-edited group selection unit includes: an area computing unit for computing the overlapping area of the editing area and each box; a judgment unit for judging whether the overlapping area computed by the area computing unit exceeds the predetermined ratio; and a selection unit for selecting groups whose box overlaps on the editing area more than the predetermined ratio.

30 Claims, 18 Drawing Sheets

FIG. 10A

| BLOCK No. | RELATION WITH OTHER BLOCK | | MOTION WITHIN THE BLOCK | |
|---|---|---|---|---|
| | OVERLAPPING | LEAVE SPACE | LINE | CHARACTER |
| 302 | × | YES | ← | ↓ |
| 303 | × | NO | → | ↓ |
| 304 | × | YES | ↑ | ← |
| 305 | ○ | NO | × | × |

APPARATUS AND METHOD FOR EDITING HANDWRITTEN STROKE

BACKGROUND OF THE INVENTION (1) Field of the Invention

The present invention relates to an apparatus and method for editing and controlling handwritten data in the form of stroke data.

(2) Description of the Related Art

A handwritten stroke editing system for processing handwritten data inputted by means of a tablet has become commercially available. The handwritten stroke editing system includes two types: one processes the handwritten data as image data, and the other processes the same as stroke data consisting of a range of points data.

The method for distinguishing characters and lines in the input stroke data is detailed in "Distinguishing Characters in Handwritten Data", Journal of Denshi Jyoho Tsushin Gokkai, October, 1990, Vol. J73-D-II, No. 10, and "Distinguishing Lines in Handwritten Data", Ibid., July 1990, Vol. J73-D-II, No. 7. Also, the stroke data editing is detailed in "Stroke Editor and Direct Command.Manipulation Mehtod", Moriya et al, Ibid., 1991, Vol. 32, No. 8. This type of stroke editor edits the sentences written along the lines on the screen using a stylus type of input device per character or line as typical word processors.

However, it is quite cumbersome to edit (i.e., delete or move) the handwritten strokes; for the user sets the system in a selection mode and specifies the strokes or characters to be edited individually.

To be more specific, the stroke editor can only recognize the handwritten characters written along the lines on the screen, and is not operable for the characters written untidy as if scribbled on a pad. Moreover, when the handwritten characters or figures are rotated, the legible direction is changed as well. Thus, it takes a few steps to change the direction of the sentences from vertical to horizontal and vice versa.

SUMMARY OF THE INVENTION

Accordingly, the present invention has an object to provide a system and method for editing a handwritten stroke that enables the user to specify an editing area easily and to write sentences untidy as if he were scribbling on a pad.

The above object can be fulfilled by a handwritten stroke data editing system comprising: a group management unit for managing group data and box data for each group, the group data representing strokes within in one group, the box data representing a box that is circumscribed to each group, the group including at least one of a character group representing a handwritten character, a word group representing a handwritten word, a line group consisting of a plurality of handwritten characters and/or words, a figure group representing a handwritten figure, a gesture recognition unit for recognizing an editing area based on a gesture inputted by a stylus, the stylus being furnished for the system, the input gesture being represented by the stroke data, the editing area including the stroke data; and a to-be-edited group selection unit for selecting a to-be-edited group by computing an overlapping area of the editing area and each box, the selected to-be-edited group having the overlapping area more than a predetermined ratio to an area of the box.

The to-be-edited group selection unit may include: an area computing unit for computing the overlapping area of the editing area and each box; a judgment unit for judging whether the overlapping area computed by the area computing unit exceeds the predetermined ratio; and a selection unit for selecting groups whose box overlaps on the editing area more than the predetermined ratio.

The to-be-edited group selection unit may assign different values as the predetermined ratio for the character group, word group, line group and figure group, respectively.

The to-be-edited group selection unit may select the character group, word group, line group, and figure group if they are included within the selected to-be-edited group.

The group management unit may include: a stroke storage unit for storing the stroke data representing a range of points data for a handwritten character stroke and a handwritten figure stroke; a group data storage unit for storing group data, the group data including an attribute indicating a hierarchy of each group, a first pointer specifying a lower hierarchy group within one group, a second pointer specifying a group in a same hierarchy within the group, the attribute including at least one of character attribute identifying to as being the character group, a word attribute identifying to as being the word group, a line attribute identifying as being the line group, a paragraph attribute for identifying as being a paragraph group, and a block attribute identifying as being a block group, the first pointer in a last hierarchy group representing the stroke data composing the group; and a box data storage unit for storing box data for each group, the box data being composed of two opposing vortices of a rectangle that is circumscribed to the group.

The above object can be also fulfilled by a method for editing handwritten stroke data for a handwritten stroke editing system comprising an input unit for inputting a handwritten stroke and an edit command, a display unit for displaying the handwritten stroke, a group storage unit for storing group data and box data for each group, the group data representing strokes in the group, the box data represents a box that is circumscribed to the group, the group including at least a character group representing a handwritten character, a word group representing a handwritten word, a line group consisting of a plurality of handwritten characters and/or words, a figure group representing a handwritten figure, an editing area determination unit for determining an editing area based on the edit command, and edit unit for editing the handwritten stroke in the editing area, the method comprising the steps of: recognizing an area including stroke data as the editing area based on the stroke data representing a gesture of a stylus specifying the editing area; and computing an overlapping area of the editing area and each box based on the editing area and the box data, a box that overlaps on the editing area exceeding a predetermined ratio to an area of the box being selected as a to-be-edited group.

According to the above structure, an area to be edited can be specified with a gesture of a stylus instead of specifying individual strokes, thereby facilitating the editing operation.

The above object can be also fulfilled by a handwritten stroke data editing system comprising: a group management unit for managing group data and box data for each group, the group data representing strokes within one group, the box data representing a box that is circumscribed to each group, the group including at least one of a character group representing a handwritten character, a word group representing a handwritten word, a line group consisting of a plurality of handwritten characters and/or words, a figure group representing a handwritten figure; a gesture recognition unit for recognizing an editing area and manipulation commands to the editing area based on a gesture inputted by unit of a stylus, the stylus being furnished for the system, the input gesture being represented by the stroke data, the editing area including the stroke data; a to-be-edited group selection unit for selecting a to-be-edited group by computing an overlapping area of the editing area and each box, the selected to-be-edited group having the overlapping area more than a predetermined ratio to an area of the box; an edit command generation unit for generating an edit command for strokes in the selected group in a manner recognized by the gesture recognition unit, and for generating an edit command to delete spaces between the groups caused by deleting the group if the edit command includes a delete command, and for generating an edit command to eliminate an overlap between the groups caused by inserting a group if the edit command includes an insert command; and an edit unit for editing strokes in both the selected and non-selected groups stored in the group management unit according to the edit commands form the edit command generation unit.

According to the above structure, the post-edit input data are arranged neatly. Thus, the user can write the sentences untidy as if he were scribbling on a pad.

The above object can be also fulfilled by a handwritten stroke data editing system comprising: a group management unit for managing group data and box data for each group, the group data representing strokes within one group, the box data representing a box that is circumscribed to each group, the group including at least one of a character group representing a handwritten character, a word group representing a handwritten word, a line group consisting of a plurality of handwritten characters and/or words, a figure group representing a handwritten figure; a gesture recognition unit for recognizing an editing area and manipulation commands to the editing area based on a gesture inputted by unit of a stylus, the stylus being furnished for the system, the input gesture being represented by the stroke data, the editing area including the stroke data; a to-be-edited group selection unit for selecting a to-be-edited group by computing an overlapping area of the editing area and each box, the selected to-be-edited group having the overlapping area more than a predetermined ratio to an area of the box; a rotation command genertion unit for generating an edit command to rotate the character and a figure within the group while maintaining their respective eligible directions when the edit command for the selected to-be-edited group recognized by the gesture recognition unit is a rotation command; and an edit unit for deleting strokes in the to-be-edited group and the groups within the to-be-edited group stored in the group management unit according to the edit commands form the rotation command generation unit.

According to the above structure, the direction of the handwritten input data can be changed while keeping their eligible direction. Thus, the sentences can be arranged in any direction. For example, sentences written in Japanese can be arranged either vertically or horizontally, or the table columns can be aligned vertically, horizontally, or in a reversed direction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

Figure 4:
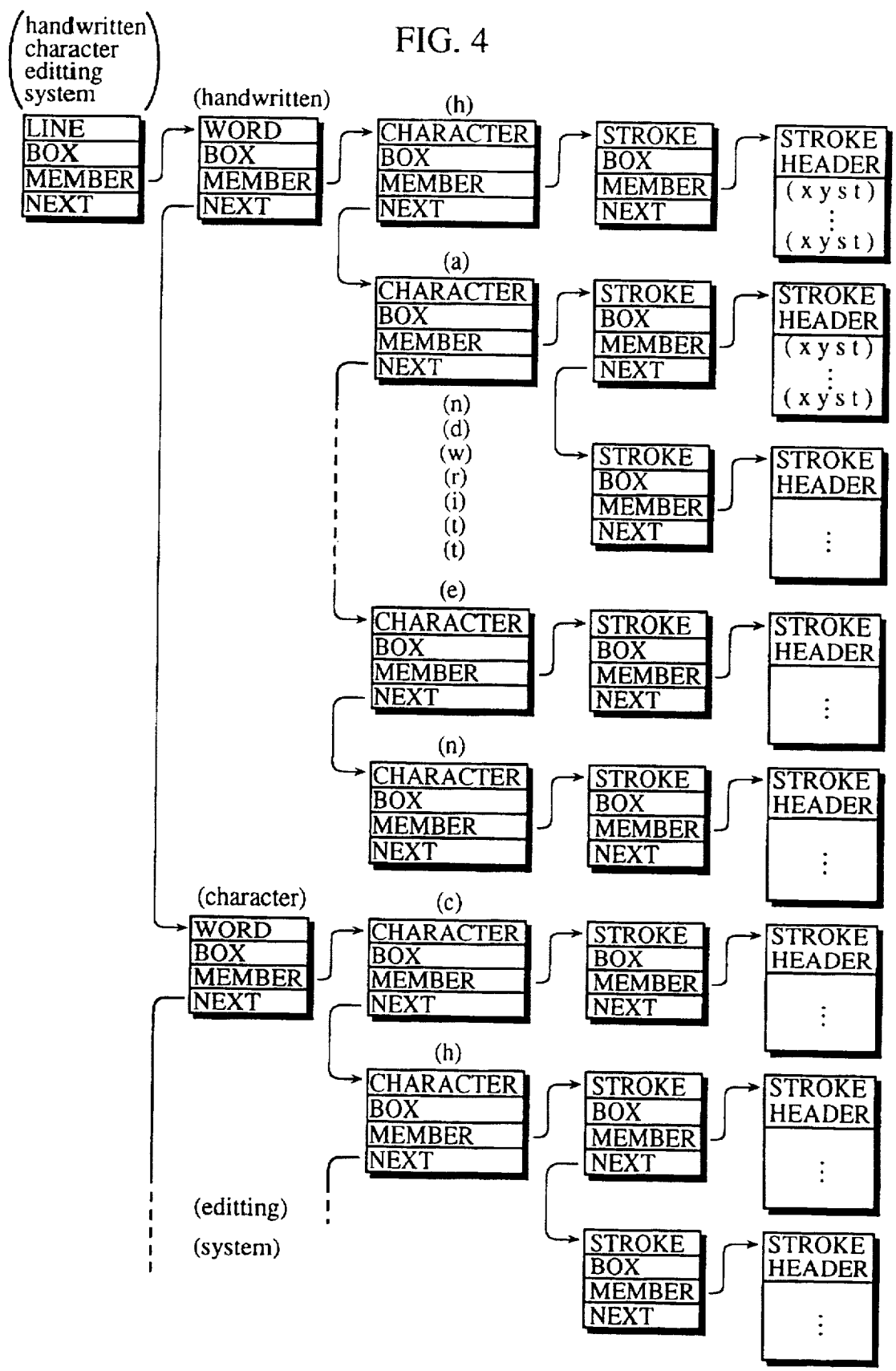
Figure 5A:
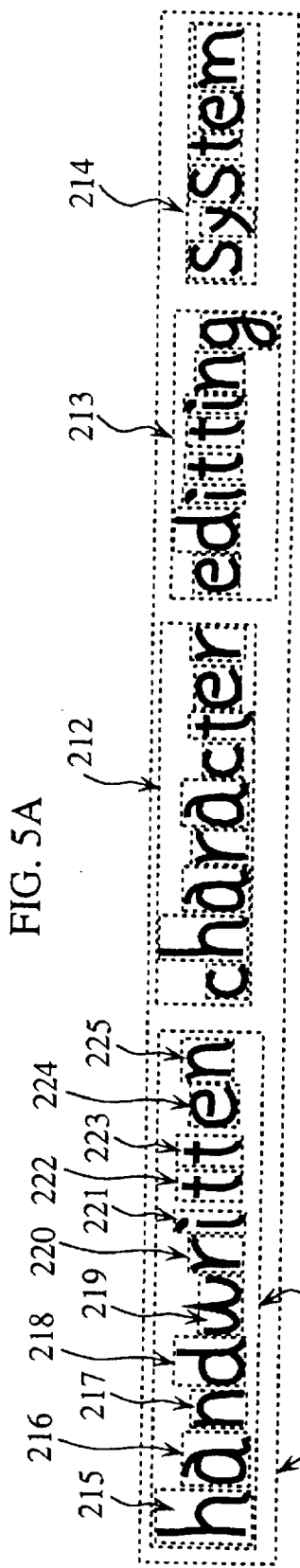
Figure 5B:
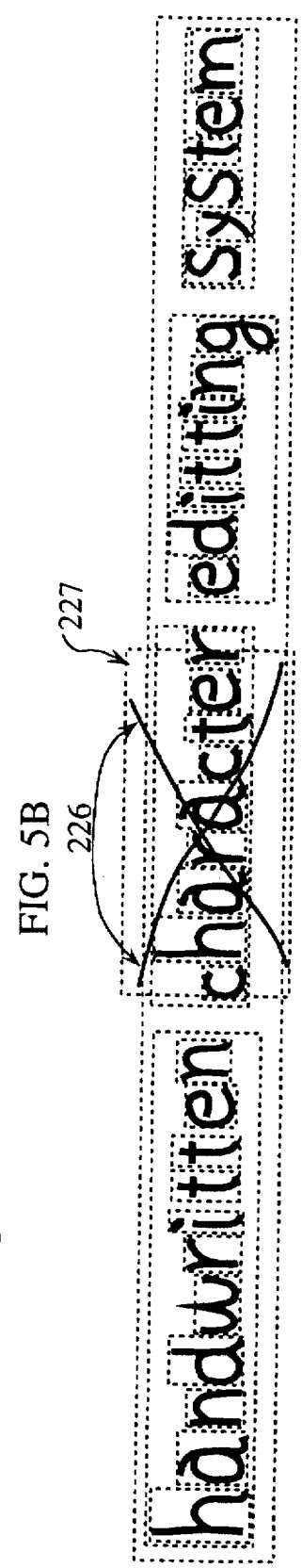
Figure 5C:
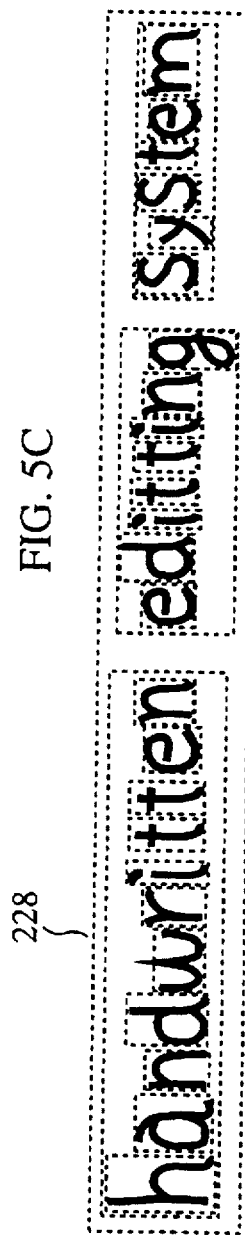
Figure 6:
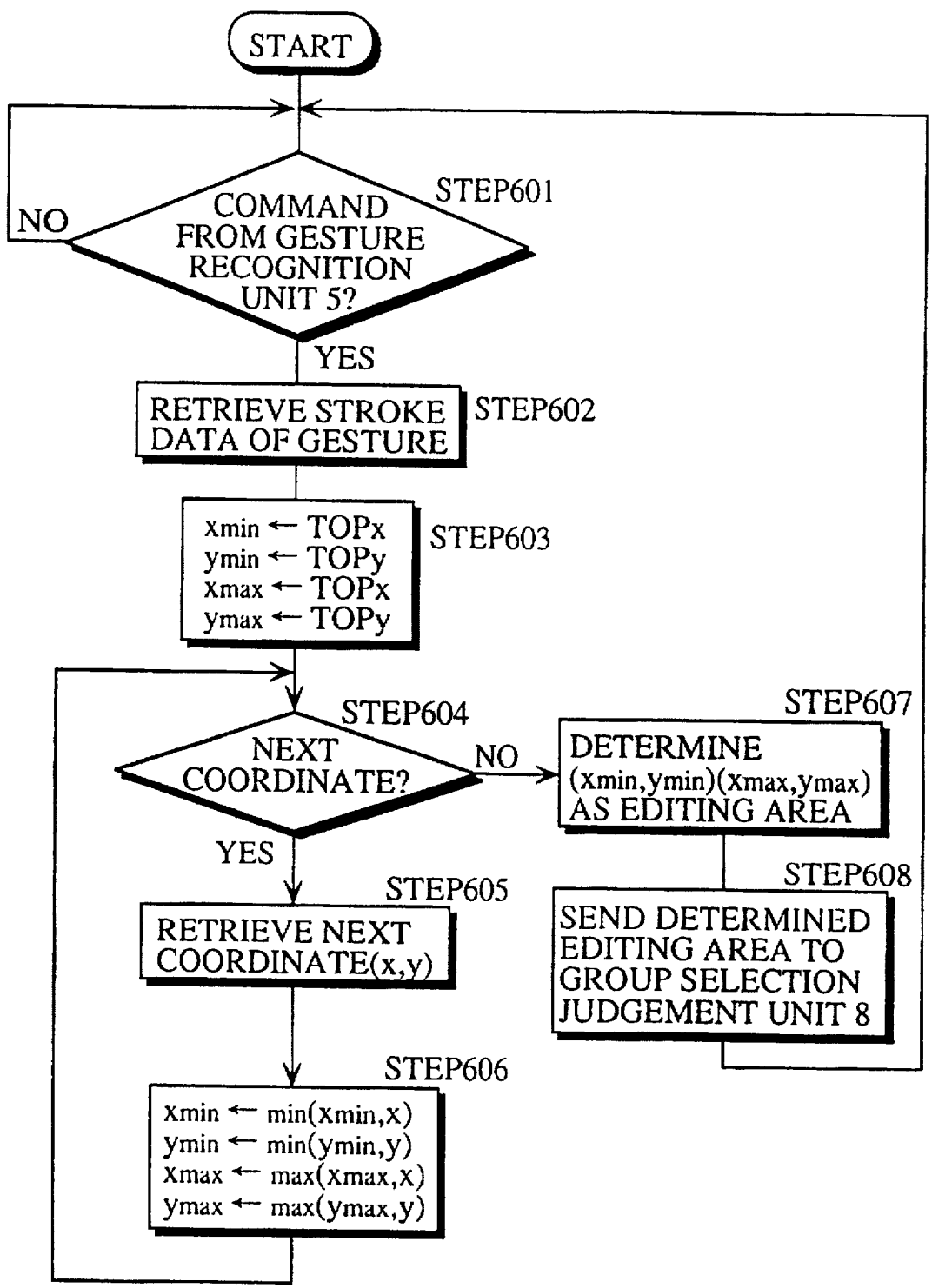
Figure 7:
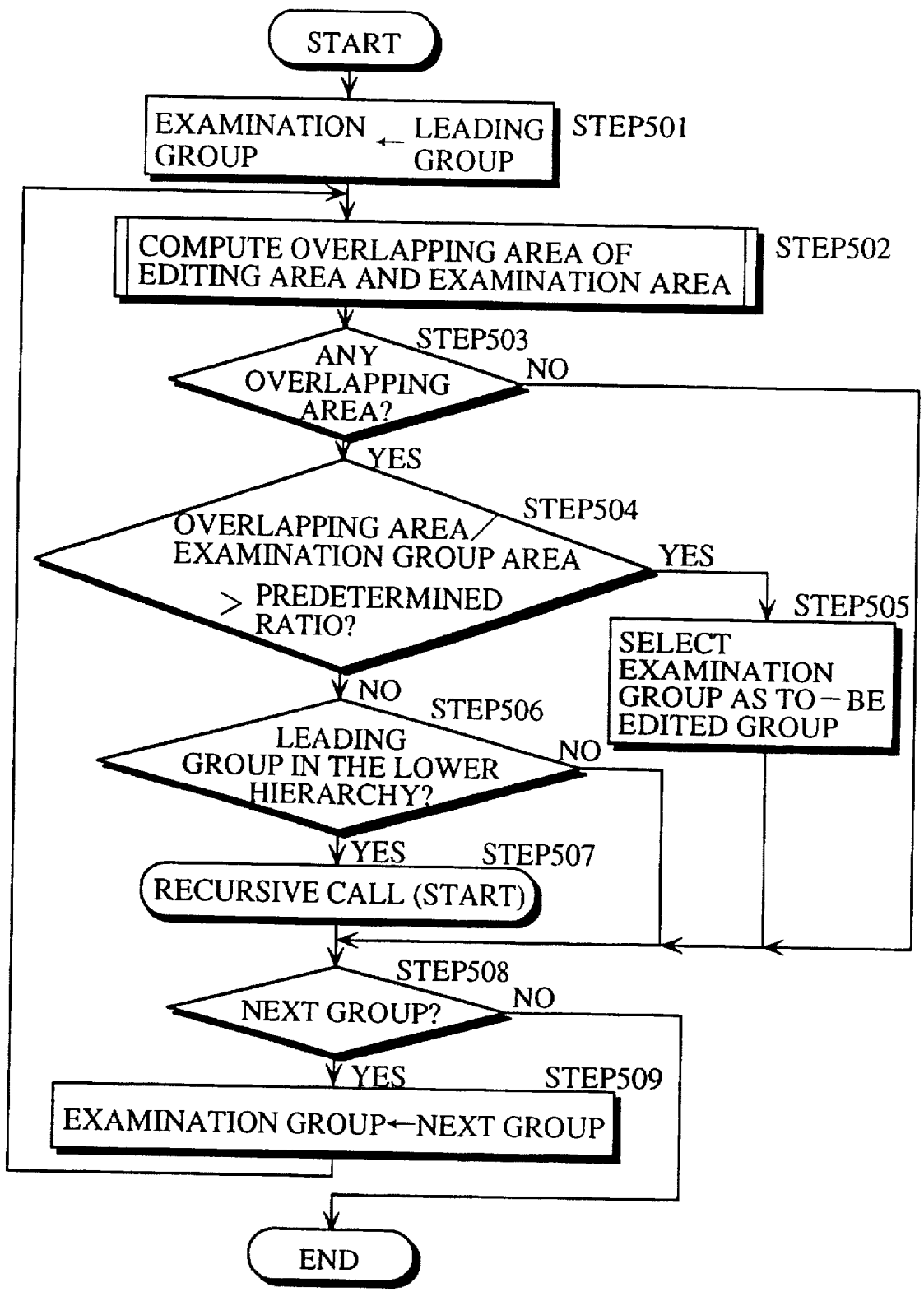
Figure 8:
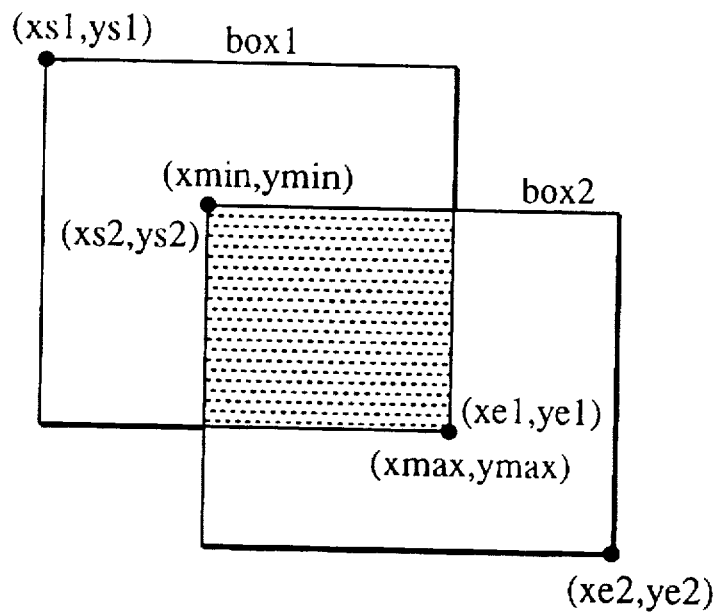
Figure 9:
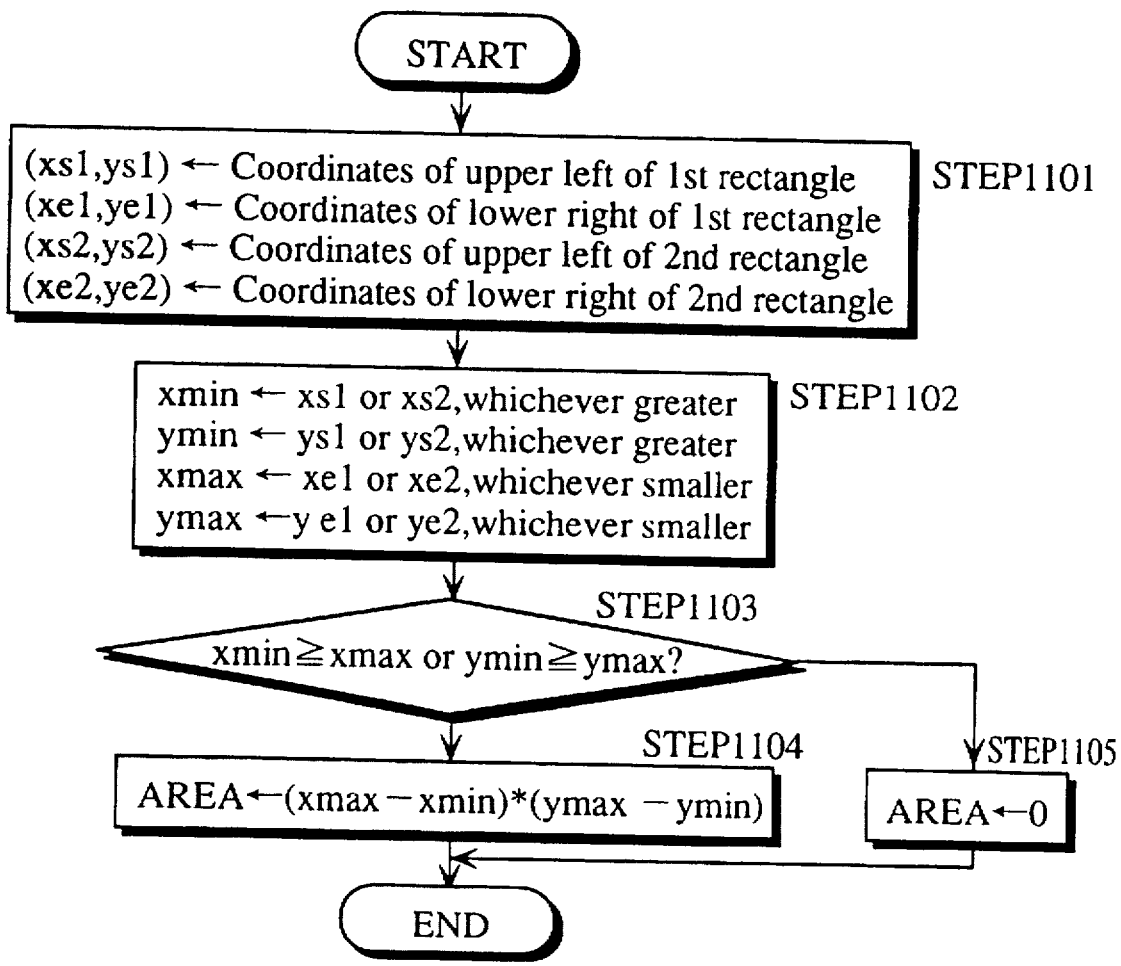
Figure 10B:
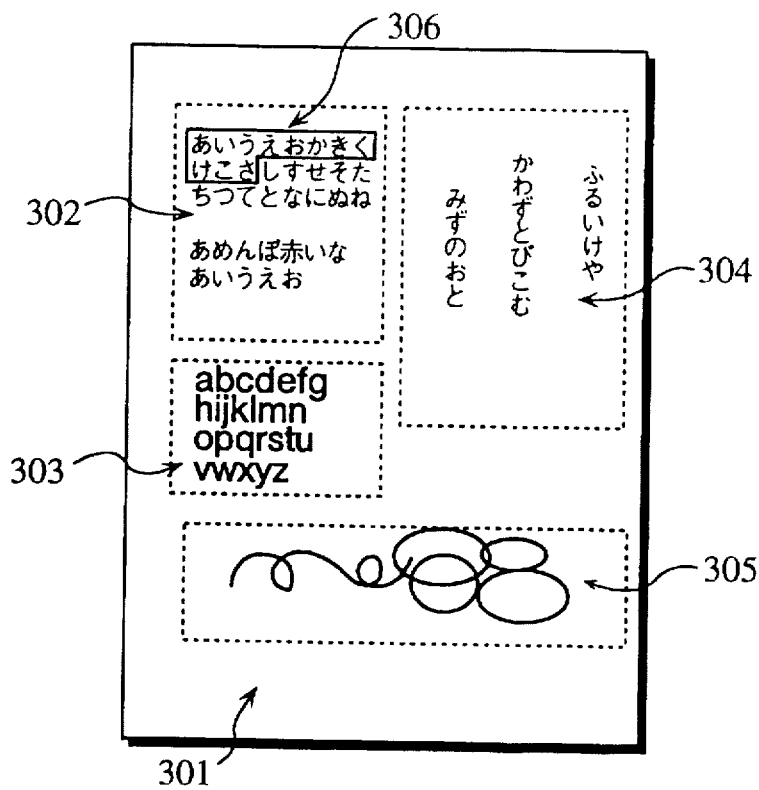
Figure 10C:
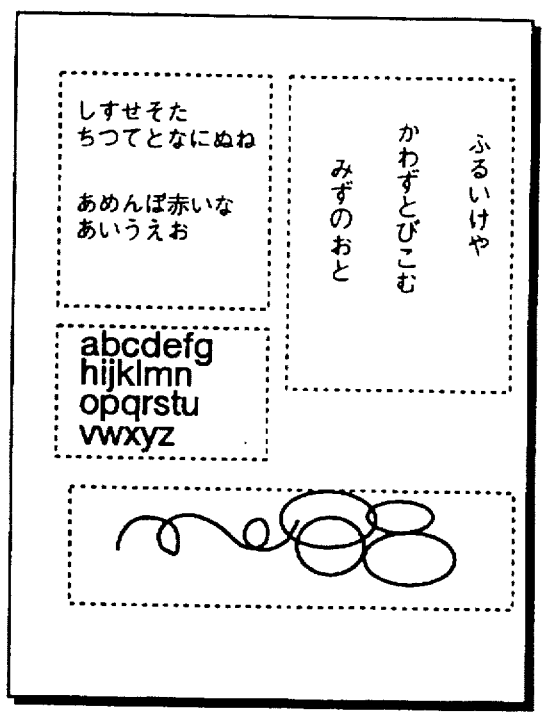
Figure 11:
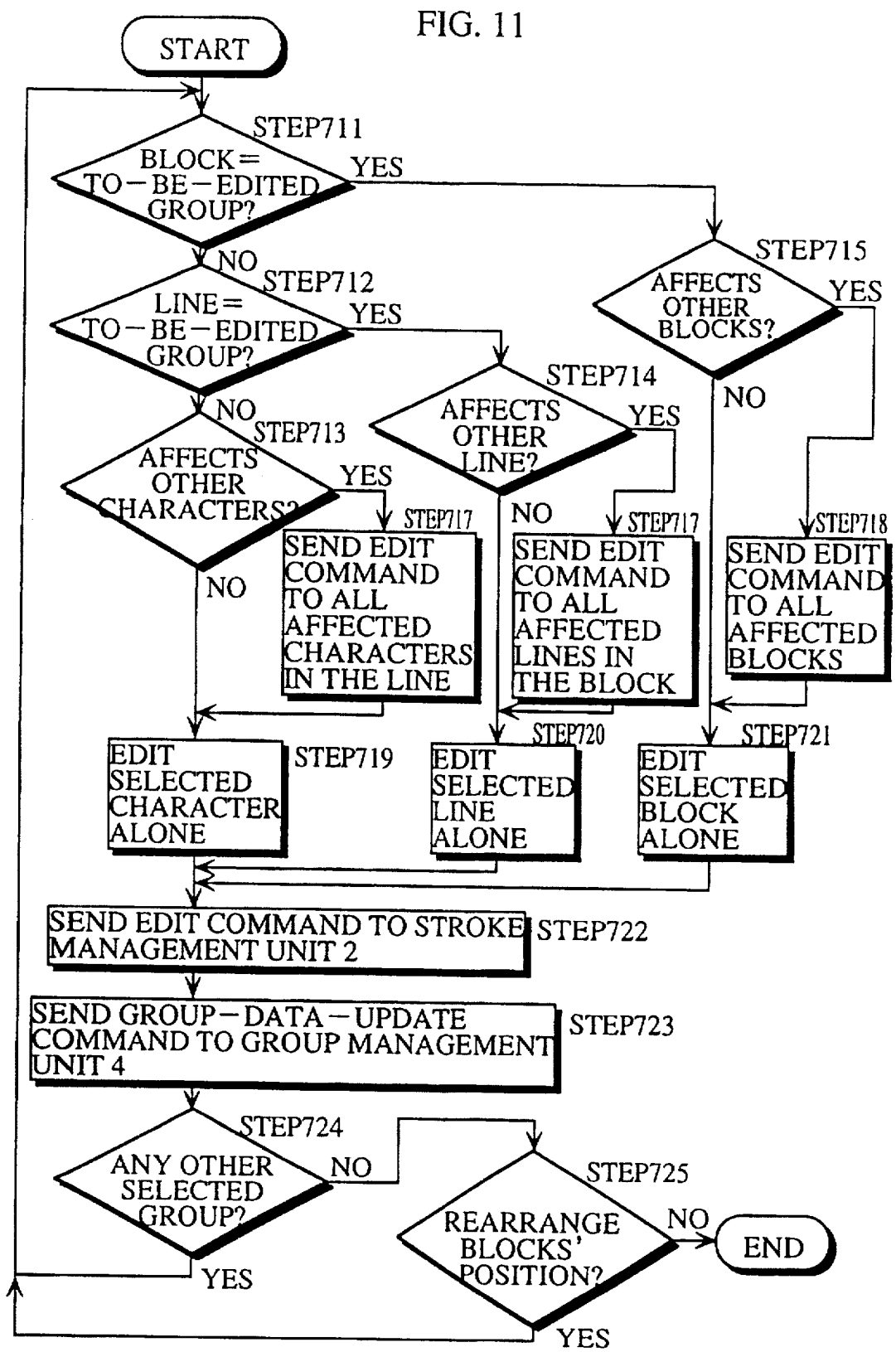
Figure 12:
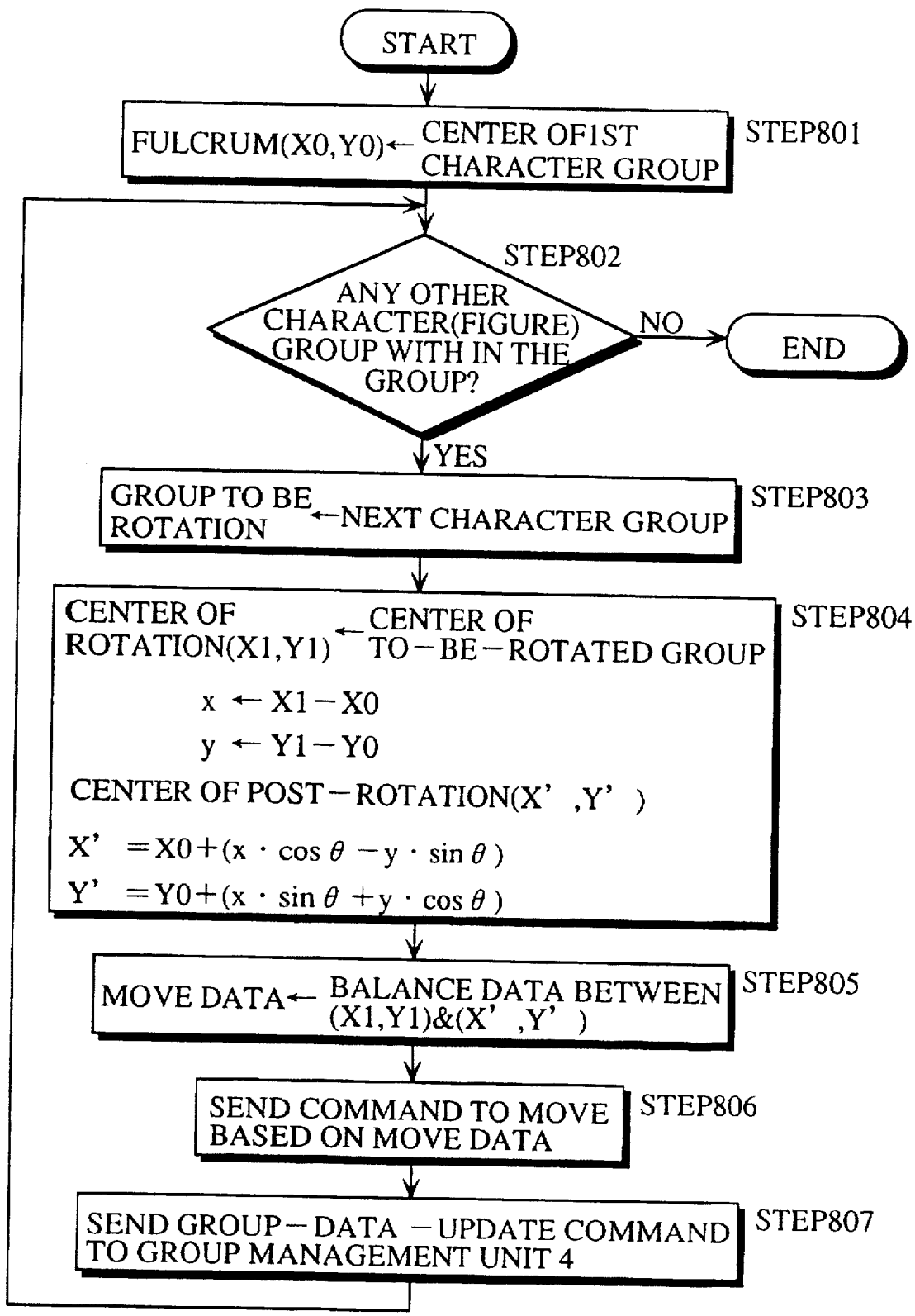
Figure 13:
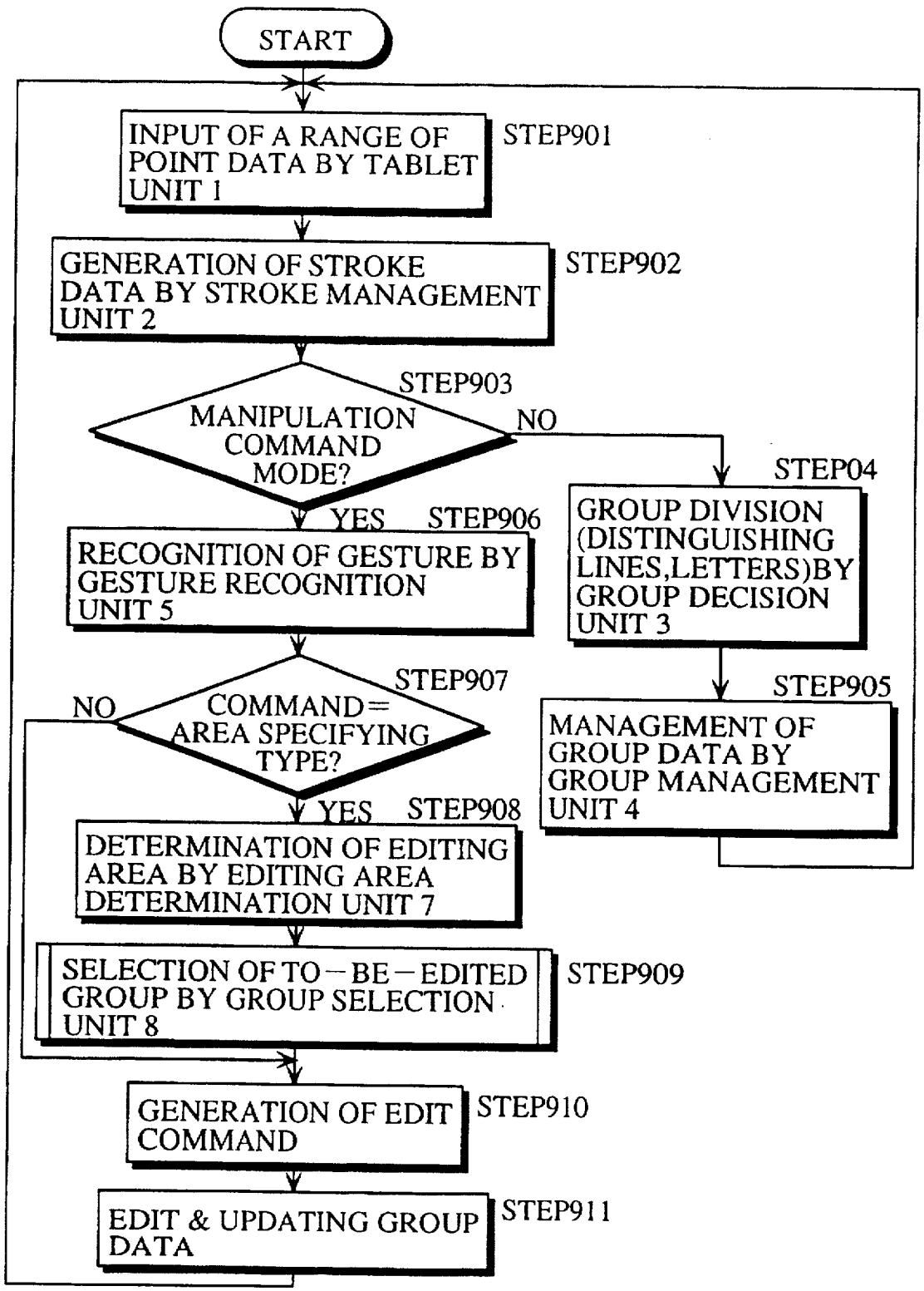
Figure 14A:
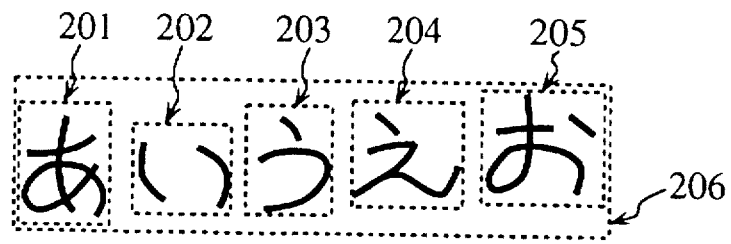
Figure 14B:
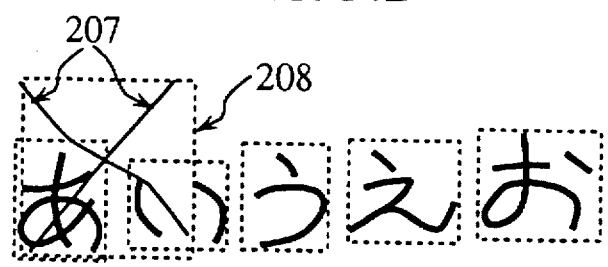
Figure 14C:
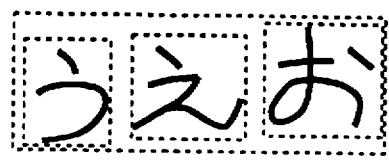
Figure 14D:
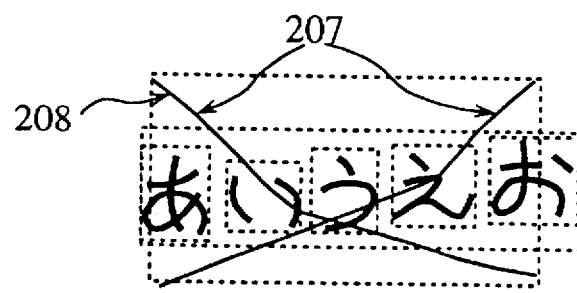
Figure 15A:
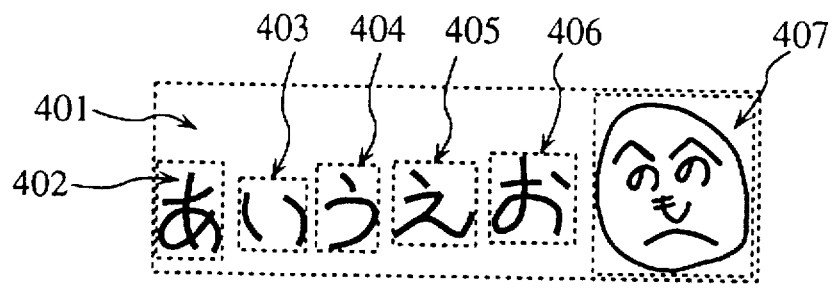
Figure 15B:
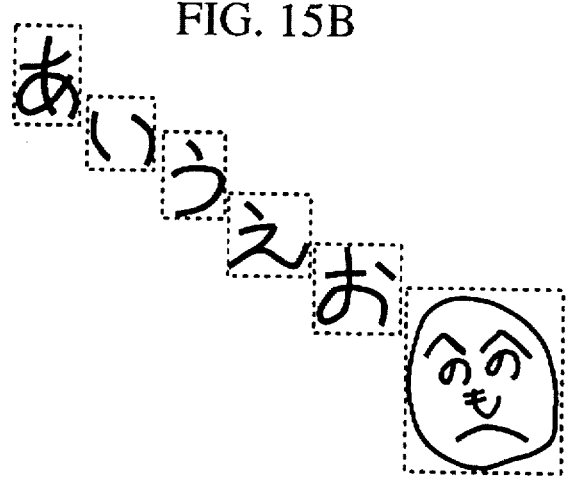
Figure 15C:
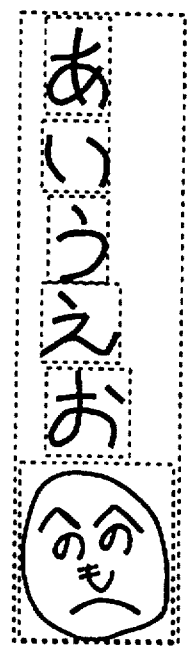
Figure 16A:
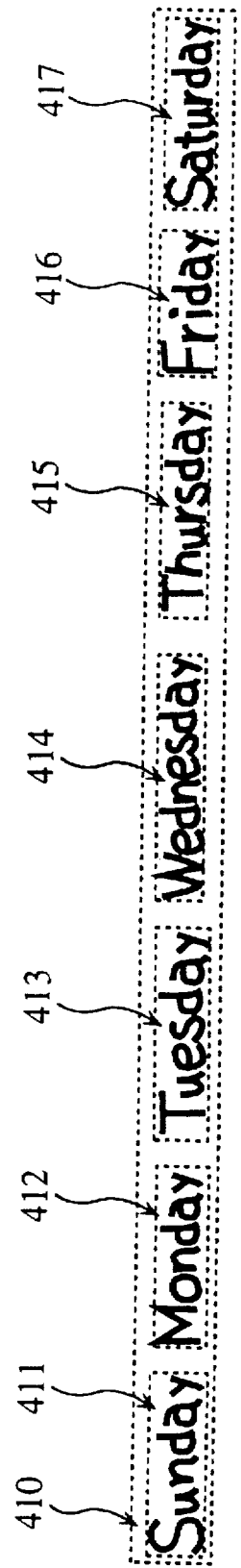
Figure 16B:
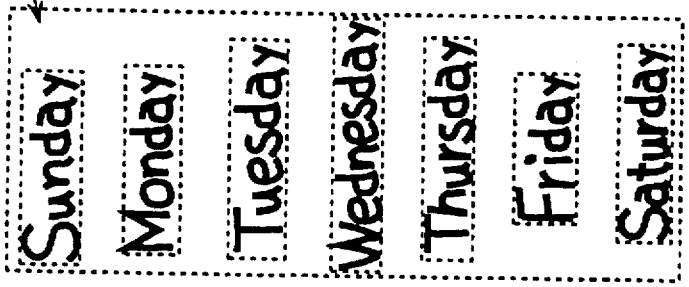
Figure 17A:
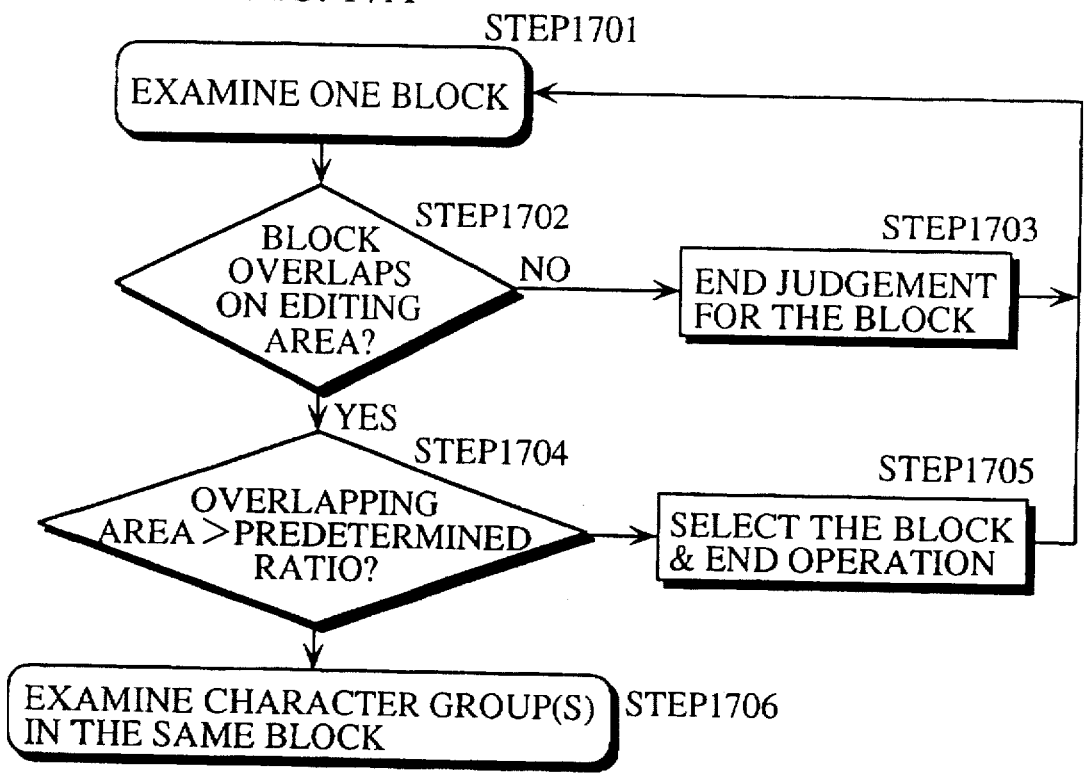
Figure 17B:
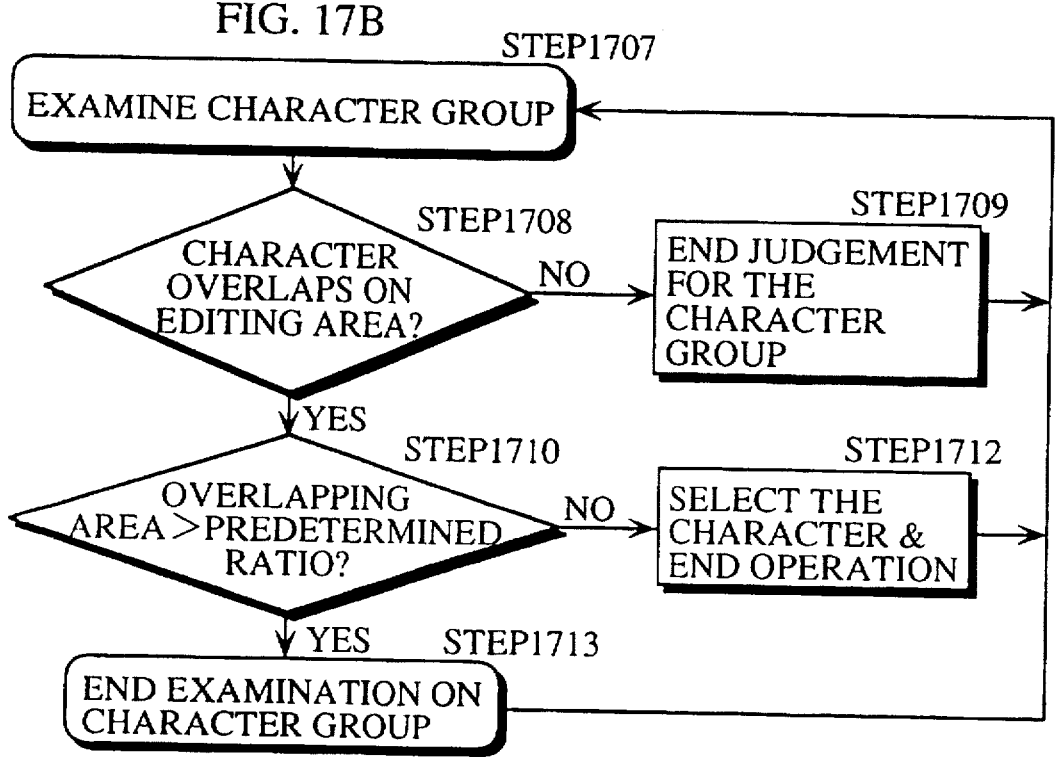
Figure 18:
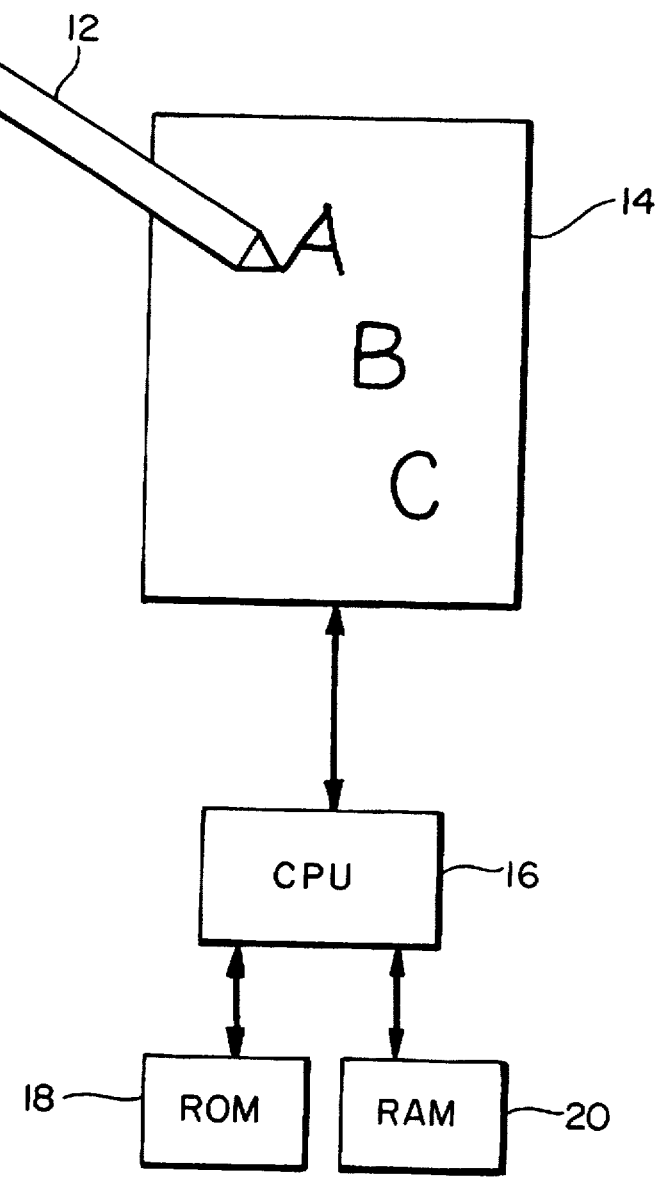

FIG. as is a format of group data stored in a group management unit;

FIG. 4 is a view showing a relation between the group information;

FIG. 5A shows an example of handwritten input data;

FIG. 5B shows a gesture for a delete command and an editing command;

FIG. 5C shows post-delete handwritten data;

FIG. 6 is a flowchart detailing an operation of an editing area determination unit;

FIG. 7 is a flowchart detailing an operation of a group selection judgment unit;

FIG. 8 is a view showing coordinates of rectangles of an examination group and editing area;

FIG. 9 is a flowchart detailing an operation to compute an overlapping area of the rectangles of the examination group and editing area;

FIG. 10A shows an example of layout data for handwritten data held in a block edit unit;

FIG. 10B shows handwritten data corresponding to FIG. 10A;

FIG. 10C shows post-edit handwritten data corresponding to FIG. 10B;

FIG. 11 is a flowchart detailing an operation of the block edit unit;

FIG. 12 is a flow chart detailing the operation of a group rotation unit;

FIG. 13 is a flowchart detailing an operation of the handwritten stroke editing system;

FIG. 14 shows an example of handwritten data;

FIG. 14B shows a "delete" gesture and an editing area for the handwritten data;

FIG. 14C shows a post-delete handwritten data after the spaces caused by the editing are deleted;

FIGS. 14D shows a "delete" command gesture and an editing area of the handwritten data;

FIGS. 15A through 15C shows examples of handwritten data explaining the operation of the group rotation unit;

FIGS. 16A and 16B are an example of handwritten data explaining the operation of the group rotation unit;

FIGS. 17A and 17B are flowcharts detailing the operation of the group selection judgment unit;

FIG. 18 is a schematic of a tablet and computer system for implementing the editing features of the present invention.

DESCRIPTION OF THE PREFERRED EMBODIMENT

Figure 1:
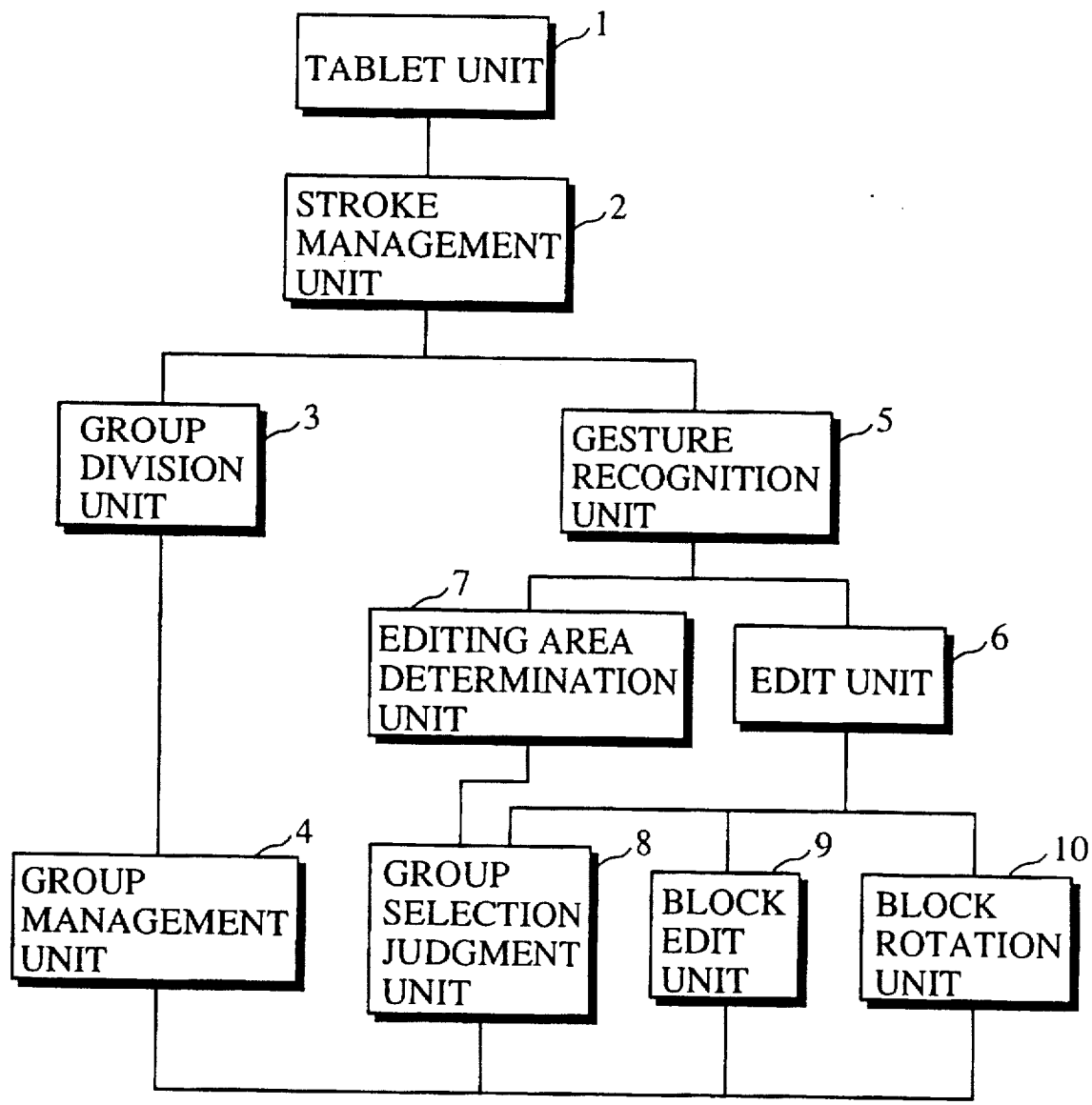
FIG. 1 is a block diagram depicting a structure of a handwritten stroke editing system in accordance with an embodiment of the present invention.

FIG. 1 is a block diagram depicting the structure of a handwritten stroke editing system in accordance with an embodiment of the present invention. FIG. 18 discloses a stylus pen 12 and a tablet 14 which are an input/output unit connected to a CPU 16 with a ROM 18 and a RAM 20.

The handwritten stroke editing system comprises a tablet unit 1, a stroke management unit 2, a group division unit as, a group management unit 4, a gesture recognition unit 5, an edit unit 6, an editing area determination unit 7, a group selection judgement unit 8, a block edit unit 9, and a group rotation unit 10.

More precisely, the tablet unit 1 is used for inputting handwritten data and operation commands by means of a stylus. The tablet unit 1 includes a side switch for switching from a data input mode to a manipulation command mode and vice versa; the handwritten data are inputted in the former, and the manipulation commands are inputted in the latter. In the data input mode, the table unit 1 outputs the coordinates for each stroke composing input handwritten characters. The coordinates are represented by a range of data points including coordinate data and time data indicating an input order. In the manipulation command mode, a manipulation command is inputted by the side switch and a manipulating area is specified by the gesture of the stylus on the tablet unit 1.

Figure 2:
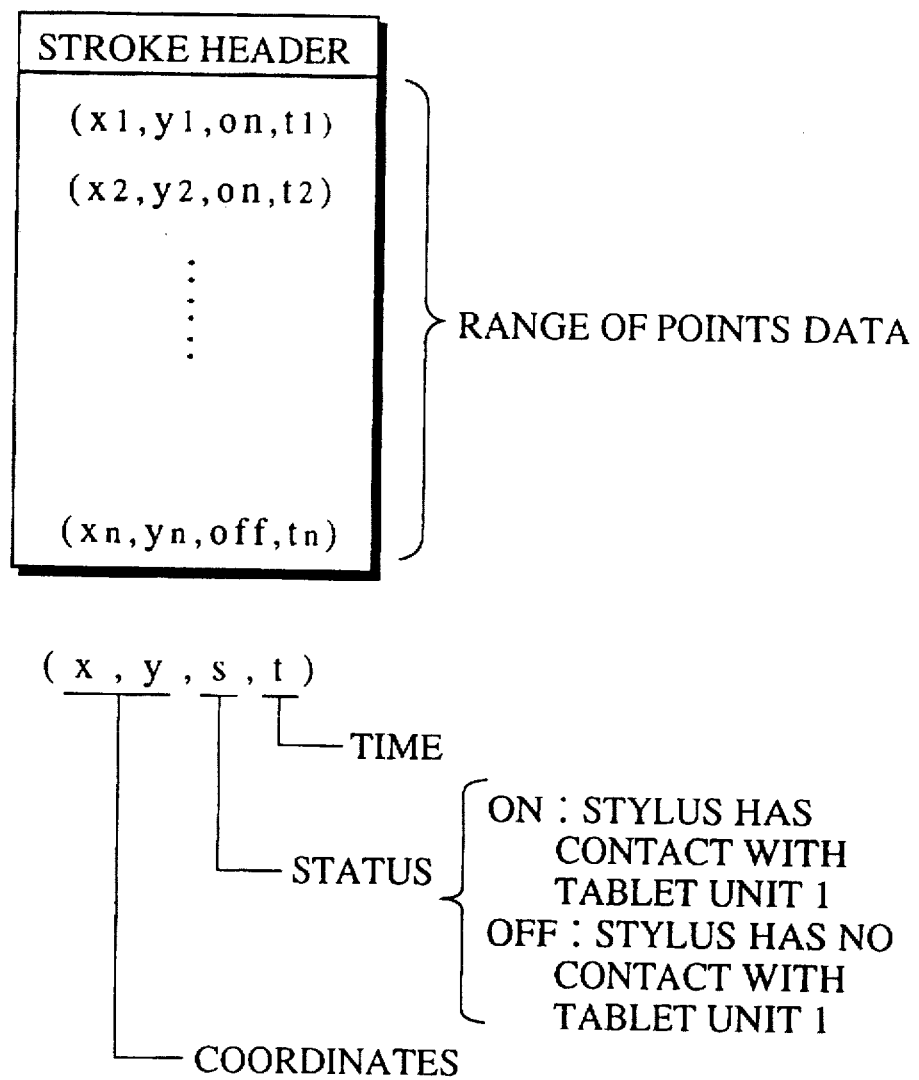
FIG. 2 is a format of stroke data stored in a stroke management unit.

The stroke management unit 2 strokes and manages the coordinates of each stroke as stroke data in order of input from the tablet unit 1. The input stroke data are sent to the group division unit as in the data input mode and to the gesture recognition unit 5 in the manipulation command mode. FIG. 2 shows a format of the stroke data: each stroke consists of a stroke header followed by a range of data points. The range of data points consist of a plurality of coordinate data (x, y, s, t). The coordinate data 'x, y' represent the coordinates at the upper left of the tablet unit 1, and the lower half of 'x' and the right half of 'y' are positive. The coordinate data 's' represent the status of the stylus; ON means the stylus has contact with the tablet unit 1, while OFF means it does not. The coordinate data 't' indicate the time when the stylus touches the tablet unit 1.

The group division unit as divides the strokes into groups of characters, lines, figures, etc. based on the stroke data in the stroke management unit 2, while it computes data related to a smallest rectangle that encircles the strokes consisting of each group; the data thus computed are referred to as a box hereinafter. The stroke data are divided into the character or line groups by various methods, and the previously mentioned "Distinguishing Characters in Handwritten data" and "Distinguishing lines in Handwritten data" detail such methods. Thus, further explanation is omitted herein.

The group management unit 4 stores and manages the location of the stroke data within each group and box for each group as group data.

Figure 3:
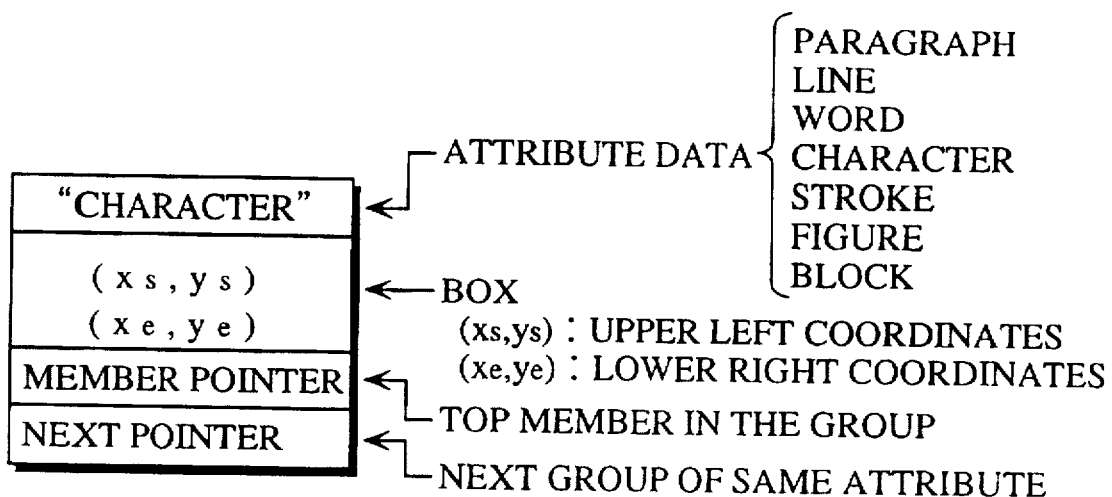

FIG. 3 shows a format for the group data stored in the group management unit 4: each group consists of attribute data, box data, a member pointer, and a next pointer. The attribute data represent the attribute (size and properties) of each group: paragraph, line, word, character, stroke, figure, and block. The box data consist of the upper left coordinates and lower right coordinates of each box. The member pointer specifies a leading member or stroke within each group. The next pointer specifies a next group of the same attribute.

FIG. 4 shows relationship between the group data that the group management unit 4 stores for handwritten input data shown in FIG. 5A. In FIG. 5A, "handwritten character editing system" (210) is a handwritten string of characters inputted by means of the tablet unit 1; "handwritten" (211), "character" (212), "editing" (213), "system" (214) represent individual word groups divided by the group division unit 3; "h" (215) "a" (216), "n" (217), "d" (218), "w" (219), "r" (220), "i" (221), "t" (222), "t" (223), "e" (224), and "n" (225) represent individual character groups within the word group 211. All these groups are stored in the group management unit 4 as the group data. As shown in FIG. 4, the groups are of a logical hierarchial structure with the member pointer and next pointer. The member pointer links the groups in different hierarchy, while the next pointer links those within the same hierarchy in order. In case of FIG. 4, the line group is the top or parent hierarchy followed by the word group, character group, and stroke group. A plurality of groups of the same attribute data exist in the same hierarchy herein; however, those of different attribute data may exist in the same hierarchy.

The gesture recognition unit 5 recognizes a manipulation command based on the shape of the stroke inputted by means of the tablet unit 1 in the manipulation command mode. When an editing area must be specified to execute manipulation commands, such as delete, copy and move commands, the gesture recognition unit 5 has the editing area determination unit 7 determine the editing area. "A Trainable Gesture Recognizer", James S. Lipscomb, IBM Thomas J. Watson Research Center, NY, USA, Feb. 5, 1991, details how the gestures are recognized, and further explanation is omitted herein. In this embodiment, assume that the manipulation command is inputted with the side switch of the tablet unit 1, and that an input mark "x" represent a delete command and an input mark " " represents a copy command, and the gesture recognition unit 5 so recognizes.

The edit unit 6 receives edit commands from the gesture recognition unit 5, block edit unit 9, and group rotation unit 10, and deletes or moves the individual strokes as per commands.

The editing area determination unit 7 receives the stroke data representing the gesture and a command to determine the editing area from the gesture recognition unit 5. The editing area determination unit 7 computes a rectangle that is circumscribed to the stroke to be edited and notifies the same to the group selection judgment unit 8 as the editing area. FIG. 5B shows an example of a gesture and a determined editing area in case of a delete command. In the drawing, the gesture "x" (226) is recognized as the delete command by the gesture recognition unit 5, and the rectangle that is circumscribed to the mark "X" is determined as the editing area by the editing area determination unit 7.

FIG. 6 is a flowchart detailing the operation of the editing area determination unit 7. When the editing area determination unit 7 receives a command from the gesture recognition unit 5 to determine the editing area (Step 601: yes), it retrieves the leading coordinates of the range of points data from the stroke data of the gesture (Step 602), and sets the initial coordinates (xmin, ymin) and (xmax, ymax) (Step 603). If the leading coordinates are followed by next coordinates (x, y) (Step 604: yes), the editing area determination unit 7 also retrieves the same (Step 605), and selects either x or xmin, whichever smaller, for xmin, and either y or ymin, whichever smaller for ymin, while selecting either x or xmax, whichever greater, for xmax and either y or ymax, whichever greater, for ymax (Step 606). When the editing area determination unit 7 repeats the above process for all the coordinates in the stroke data representing the gesture (Step 604: no), it determines (xmin, ymin) and (xmax, ymax) as the upper left coordinates and lower right coordinates of the rectangle that is circumscribed to the gesture stroke, respectively (Step 607), notifying the same to the group selection judgment unit 8 as the editing area (Step 608).

The group selection judgment unit 8 compares the editing area determined by the editing area determination unit 7 and the box data of each group stored in the group management unit 4 to judge and select a group to be edited. FIG. 7 is a flowchart detailing the operation of the group selection judgment unit 8. The flowchart is recursive, that is to say, each group is called out from itself. To begin with, the group selection judgment unit 8 makes the leading (top in the hierarchy) group within the group management unit 4 of an examination group (Step 501), and computes the overlapping area of the examination group and editing area determined by the editing area determination unit 7 (Step 502). If there is no overlapping area (the result of the computation is nil) (Step 503: no), the group selection judgment unit 8 makes the next group in the same hierarchy identified by the next pointer of the examination group (Steps 508, 509), and computes the overlapping area with the editing area.

If there is an overlapping area (Step 503: yes) and Equation (1) below is satisfied (Step 504: yes), then the group selection judgment unit 8 selects the examination group as the group to be edited (Step 505).

overlapping area/area of the examination group>a predetermined ratio for each hierarchy (1)

The predetermined ratio is a constant number assigned to each attribute data of the examination group. For example, 80%, 70%, and 60% are assigned to the character group, word group, and line group, respectively. However, one ratio, such as 70% may be assigned to all the groups.

The group selection judgment unit 8 finds a next group within the same hierarchy identified by the next pointer (Step 508: yes) and makes the same evaluation of the examination group (Step 509) to compute the overlapping area.

If the computed overlapping area does not satisfy Equation (1) (Step 504: no), the group selection judgment unit 8 makes the leading group in he lower hierarchy identified by the member pointer of the examination group to compute the overlapping area (Step 507: recursive call). The above process is repeated until the flow reaches the last group (Step 508).

FIG. 9 is a sub-chart detailing Step 502 in FIG. 7, where the overlapping area is computed. Assume that the box 1 and box 2 shown in FIG. 8 are to be edited; the box 1 has its upper left coordinates and lower right coordinates at (xs1, ys1) and (xe1, xe1), respectively, and a box 2 has its upper left coordinates and lower right coordinates at (xs2, ys2) and (xe2, ye2), respectively. In FIG. 9, the group selection judgment unit 8 sets the box data of the examination group as (zs1, ys1) and (xe1, ye1), and the editing area as (zs2, ys2) and (ze2, yes (Step 1101). Since the lower half of the x and right half of the y are positive, if (xmin, ymin) and (xman, ymax) are the upper left and lower right coordinates of the overlapping area, then the group selection judgment unit 8 sets the coordinates as below (Step 1102):

(xmin, ymin)=(max(xs1, sx2), max(ys1, ys2))

(xmax, ymax)=(min(xe1, xe2), min(ye1, ye2))

where max(a, b) is either a or b whichever greater, and min(a, b) is either a or b whichever smaller.

The group selection judgment unit 8 computes nil for the overlapping area when xmin≧xmax or ymin≧ymax (Step 1105); otherwise, it computes the overlapping area using (xmax-xmin) times (ymax-ymin) (Step 1104).

The block edit unit 9 manages a plurality of groups as a block and holds layout data. The layout data are the data showing whether to maintain the current position with respect to the other blocks to be moved, and the direction if the block should be moved. After the group selected by the group selection judgment unit 8 is edited, and the edit unit 6 edits any block in the selected block in such a manner that changes the layout (delete or move), the block edit unit 9 sends an edit manipulation command with respect to the concerned groups to the edit unit 6.

FIG. 10A is an example of the layout data for the handwritten data. The layout data consist of the data specifying the location with respect to the other blocks and the data specifying the moving direction in the block for each block. The former includes the data specifying the overlap on the other blocks and the spaces between the other blocks, while the latter includes the data specifying the motion of the lines and characters. In the drawing, the block No. represents the blocks in the handwritten data.

FIG. 10B shows an example of the handwritten data for the block Nos. 302 through 305 in FIG. 10A. The block 302 includes "あいうえおかきくけこさしすせそたちつてとなにぬ" (a-i-u-e-o-ka-ki-ku-ke-ko-sa-shi-su-se-so-ta-chi-tsu-te-to-an-ni-nu) or the horizontal handwritten data in Japanese Hiragana, "あめんぼあかいな" (a-me-n-bo-a-ka-i-an) or the horizontal handwritten data in Japanese Hiragana and Chinese character, and "あいうえお" (a-i-u-e-o), or the horizontal handwritten data in Japanese Hiragana. The block 303 is the horizontal handwritten data in alphabets "abcdefghijklmnopqrstuvwxyz". The block 304 is the vertical handwritten data in Japanese Hiragana, or a Japanese seventeen syllable poem, "ふるいけや かわずとびこむみずのおと" (fu-ru-i-ke-ya ka-wa-zu-to-bi-ko-mu mi-zu-no-o-to). The block 305 is handwritten figure data. For example, according to the layout data in FIG. 10A, the block 302 is placed so as not to overlap on the other blocks, and leaves the spaces between the other blocks. While the line space caused by the editing are deleted by moving the following lines upward, and the spaces between the characters caused by the editing are deleted by moving the remaining characters in the right to the left.

FIG. 11 is a flowchart detailing the operation of the block edit unit 9. The block edit unit 9 judges whether the group selected by the group selection judgment unit 8 is the block group, line group, or character group (Steps 711 and 712). In case of the character group (Step 712: no), the block edit unit 9 judges whether the editing result affects the other character groups within the same line. If so (Step 713: yes), the block edit unit 9 determines to send a command to move all the character group within the line group (Step 716). Otherwise (Step 713: no), it determines to send a command to edit the selected character group alone (Step 719).

In case of the line group (Step 712: yes), and the editing result of the selected line group effects the other lines (Step 714: yes), the lock edit unit 9 determines to send a command to move all the line groups in the block group (Step 717). Otherwise (Step 714: no), it determines to send a command to edit the selected line group alone (Step 720).

In case of the block group (Step 711: yes), and the editing result of the selected block group affects the other block groups (Step 715: yes), it determines to send a command to move all the block groups (Step 718). Otherwise (Step 715: no), it determines to send a command to edit the selected block group alone (Step 721).

The block edit unit 9 subsequently outputs the editing command thus determined to the edit unit 6, and deletes or moves the stroke data to be deleted or moved (Step 722), and notifies the change in the group data caused by the editing (delete or move) of the line group to the group management unit 4 to update the group data therein (Step 732).

When there is any other group selected by the group selection judgment unit 8 to be edited, or when the blocks overlap as the result of the editing, that is to say, when the position of the blocks must be rearranged (Step 725: yes), the flow returns to Step 711. When there is no selected group to be edited and there is no need to rearrange the position of the blocks (Step 724: no, Step 725: no), the block editing operation ends.

The block rotation unit 10 rotates the lines or blocks while maintaining the letters or figures within the group in the legible direction. FIG. 12 is a flowchart detailing the operation of the group rotation unit 10. The group rotation unit 10 computes the center of the rotation or the character group within the block group, around which the block group is rotated to find the fulcrum (X0, Y0) of the rotation (Step 801). When there is any other character group within the block group to be rotated (Step 802: yes), the group rotation unit 10 determines the next character group as the one to be rotated (Step 803).

The group rotation unit 10 computes the center coordinates of the post-rotation character group (Step 804). The post-rotation center (X',y') is computed as follows:

$$X'=X0+(x\cos\theta-y\sin\theta)$$

$$Y'=Y0+(x\cos\theta+y\sin\theta)$$

where (X1, Y1) is the center of the rectangle of the pre-rotation character group, and (x,y)=(X1−X0, Y1−Y0).

The group rotation unit 10 computes off-set data, or namely, the distance between the pre-rotation center and post-rotation center (Step 805). A move command sent to the edit unit 6 is based on the off-set data thus computed, and the group is moved by changing the coordinates of the stroke data in the stroke management unit 2 (Step 806). Accordingly, the change in the character group data are notified to the group management unit 4 to update the character group data therein (Step 807).

To stress the characteristics of the present invention, the operation of the above-described handwritten stroke editing system will be explained in four aspects:

(1) the operation of the handwritten stroke editing system;

(2) the operation of the group selection judgment unit 8 for a delete command;

(3) the operation of the block edit unit 9 for a delete command within one block; and (4) the operation of the group rotation unit 10 for a rotation command.

THE HANDWRITTEN STROKE EDITING SYSTEM

FIG. 13 is a flowchart detailing the operation of the handwritten stroke editing system. To begin with, when the handwritten data are inputted by means of the tablet unit 1 with the stylus (Step 901), the stroke data are generated for each stroke while the stylus has contact with the tablet unit 1 (Step 902).

When the system is set in the data input mode (Step 903: no), the stroke data thus generated are delivered from the stroke management unit 2 to the group division unit 3, which divides the stroke data into a set of groups by distinguishing the lines or characters, generating the group data such as line groups or character groups (Step 904). The group data thus generated are stored in and managed by the group management unit 4 (Step 905).

When the system is set in the manipulation command mode (Step 903: yes), the stroke data are delivered from the stroke management unit 2 to the gesture recognition unit 5, which recognizes a manipulation the user intends to perform from the size of the stroke (Step 906). When the recognized gesture does not need the specification of the editing area (for example, the editing command to an already specified editing area) (Step 907: no), the flow proceeds to Step 910. When the recognized gesture demands the specification of the editing area (for example, a delete command or command to select a group to be edited) (Step 907: yes), the editing area determination unit 7 computes a rectangle that encircles the gesture stroke, and determines the same as the editing area, delivering the same to the group selection judgment unit 8 (Step 908). The group selection judgment unit 8 determines the group to be edited according to the overlapping areas of the editing area and the other groups (Step 909).

In this way, the group to be edited and editing manipulation are determined, and the block edit unit 9, group rotation unit 10, and edit unit 6 generate editing commands based on the determined editing manipulation (Step 910). The edit unit 6 retrieves the group data from the group management unit 4, and the stroke data from the stroke management unit 2 as per editing command to edit the to-be-edited group and update the group data and stroke data (Step 911).

SELECTION JUDGMENT UNIT 8 (IN CASE OF DELETE COMMAND)

FIRST EXAMPLE

Assume that the handwritten data in FIG. 5A are to be partially deleted. Also, assume that the stroke data and group data for the handwritten data in FIG. 5A are stored in the stroke management unit 2 and stroke group management unit 4, respectively, and that each hierarchy is assigned a predetermined ratio of 80%.

To delete the handwritten stroke in FIG. 5A partially, the user sets the system in the manipulation command mode by the side switch of the tablet unit 1, and draws a gesture represented by the mark "X" on the characters to be deleted. The input stroke data in the manipulation command mode are assumed to be the gesture data, and inputted into the gesture recognition unit 5 via the stroke management unit 2. The gesture recognition unit 5 recognizes that the command is a delete command form its shape and sends the stroke data to the editing area determination unit 7. FIG. 5B shows an example of the gesture stroke "X" represented by numeral 206, specifying an area to be deleted. The editing area determination unit 7 computes a rectangle that is circumscribed to the stroke data from the gesture recognition unit 5, and determines the same as an editing area 227, sending the same to the group selection judgment unit 8. In other words, the editing area 227 in FIG. 5B shows an editing area determined by the editing area determination unit 7 for the stroke 226.

Upon receipt of the editing area 227 from the editing area determination unit 7, the group selection judgment unit 8 selects the group to be edited according to the flowchart in FIG. 7.

To be more specific, the editing area determination unit 7 makes the line group 210 of the examination group from the group data managed by the group management unit 4 (Step 501). The line group 210 is not selected as the to-be-edited group; for the overlapping area on the editing area 227 is less than 80% (Step 504: no). Thus, the editing area determination unit 7 makes the word group 211 "handwritten" in the lower hierarchy of the examination group (Step 507). The word group 211 "handwritten" is not selected either; for there is no overlapping area (Step 503: no). Subsequently, the editing area determination unit 7 makes the word group 212 "character" of the examination group (Steps 508 and 509). Since the overlapping area of the editing area 227 and the word group 212 "character" is greater than 80% (Step 504), the word group 212 is selected as the to-be-edited group (Step 505). The word group 213 "editing" and word group 214 "system" are processed in the same manner, and the word group 212 "character" alone is selected as the to-be-edited group.

The selected word group 213 is sent to the edit unit 6, which in turn deletes the stroke data and group data for the word group 213 from the stroke management unit 2 and group management unit 4, respectively based on the delete command recognized by the gesture recognition unit 5 and editing area notified by the editing area determination unit 7.

While at the same time, the block edit unit 9 updates location of the word groups 213 and 214 and the box data for the group 201, and stores the result in the group management unit 4 when the block edit unit 9 has sent a command to delete the spaces caused by the editing. FIG. 5C shows the result of deleting the group and space caused by deleting the group.

SECOND EXAMPLE

Assume that the handwritten data in FIG. 14A are partially deleted. In the drawing, numerals 201 through 205 represent character groups in Japanese Hiragana "あいうえお" (a-i-u-e-o), respectively. Numeral 206 represents a line group that includes the character group 201 through 205. The stroke data and group data for the handwritten data in FIG. 14A are stored in the stroke management unit 2 and stroke group management unit 4, respectively.

Numeral 207 in FIG. 14B shows the gesture stroke "X" specifying an area to be deleted. The editing area determination unit 7 computes a rectangle that is circumscribed to the stroke data from the gesture recognition unit 5, and determines the same as the editing area 208, sending the same to the group selection judgment unit 8. In other words, the editing area 208 specifies the editing area determined by the editing area determination unit 7 for the stroke 207.

Upon receipt of the editing area 208 from the editing area determination unit 7, the group selection judgment unit 8 selects the to-be-edited group according to the flowchart in FIG. 7.

To be more specific, the editing area determination unit 7 makes the line group 206 of the examination group based on the group data managed by the group management unit 4 (Step 501). The line group 206 is not selected; for the overlapping area on the editing area 208 is less than 80% (Step 504: no). Thus, the editing area determination unit 7 makes the character group 201 "あ" (a) in the lower hierarchy of the examination group (Step 507). The character group 201 "あ" (a) is selected as the to-be-edited group; for the overlapping area on the editing area 208 is greater than 80% (Step 504: yes). The character groups 202 "い" (i), 203 "う" (u), 204 "え" (e), and 205 "お" (o) in the same hierarchy are processed in the same manner, and only the character group 202 "い" (i) is selected as the to-be-edited group for having the overlapping area greater than 80% (Steps 504, 508, and 509). Consequently, the character groups 201 "あ" (a) and 202 "い" (i) are selected as the to-be-edited groups.

The selected character groups 201 "あ" (a) and 202 "い" (i) are sent to the edit unit 6, which in turn deletes the stroke data and group data for the character groups 201 "あ" (a) and 202 "い" (i) from the stroke management unit 2 and group management unit 4, respectively, according to the delete command recognized by the gesture recognition unit 5 and the editing area determined by the editing area determination unit 7.

While at the same time the edit unit 6 updates the location of the character groups 202 through 205 and the box data for the line group 206 to stoke the result in the group management unit 4 when the block edit unit 9 has sent a command to delete the spaces in the line group 206 caused by the editing. In this way, the character groups 201 and 202 are deleted while the spaces caused by the editing being deleted by moving the remaining character groups to the left as shown in FIG. 14C.

When the editing area 208 considerably overlaps on the line group 206 as shown in FIG. 14D, the editing area determination unit 7 selects the block group 206 in Steps 504 and 505, deleting the block group 206 completely as a result of the editing.

In case that the selection area is specified by the stylus as gesture as is with the first and second examples, the user can specify the editing area by roughly indicating the area instead of specifying individual strokes, facilitating the editing operation.

Note that the predetermined ratio used in Step 504 in FIG. 7 may be changed for individual users, or may be determined automatically by learning the user's habit.

BLOCK EDIT UNIT 9 (IN CASE OF BLOCK DELETE COMMAND)

Assume that numeral 306 in the block group 302 in FIG. 10B is to be deleted.

Also assume that the stroke data and group data for the handwritten data in FIG. 10B are stored in the stroke management unit 2 and stroke group management unit 4, respectively, and that the layout data shown in FIG. 10A are held in the block edit unit 9. In addition, assume that the group selection judgment unit 8 has selected the area 306 as the area to be edited, and the gesture recognition unit 5 has recognized a delete command, which has been sent to both the edit unit 6 and block edit unit 9.

To be more specific, the block edit unit 9 generates a plurality of detailed editing commands for the "delete" manipulation command based on the layout data in FIG. 10A and sends the same to the edit unit 6.

The block edit unit 9 judges whether the specified editing area is the entire block group (Step 711 in FIG. 11). In case of FIG. 10B, the editing area 306 includes one line group "あいうえおかきく" (a-i-u-e-o-ka-ki-ku) and three character groups "けこさ" (ke-ko-sa). Since the line group has been selected (Step 712:yes), the edit unit 9 judges whether deleting the line group affects the other line groups (Step 714;yes). In this case, under Rule 603 in FIG. 10A, when a line group is deleted, all the following line groups are moved upward. Thus, edit unit 9 generates a command to move all the lines in the block 302 upward by one line (Step 717). At the same time, the edit unit 9 generates a command to delete the line group "あいうえおかきく" (a-i-u-e-o-ka-ki-ku), while sending detailed commands to the stroke management unit 2 such as "move" and "delete" commands for individual stroke data to be deleted (Step 722). The change in the group data caused by deleting or moving the line group is sent to the group management unit 2 to update the group data therein (Step 723).

The above editing process is repeated until there is no selected group. In this case, since the three character groups "けこさ" (ke-ko-sa) are selected as the to-be-deleted groups (Step 724:yes), the edit unit 9 checks whether deleting the three character groups affects the other character groups (Step 711:no, Step 712:no, Step 713:yes).

13

Under Rule 604, when a character group is deleted, the remaining character groups to the right within the same line group are to be moved to the left. Thus, the edit unit 9 generates an editing command "move" for all the character groups to be moved after the selected character groups are deleted (Step 716). Subsequently, the edit unit 9 generates a command "delete" for the selected character groups "けこさ" (ke-ko-sa) (Step 719), and sends detailed editing commands to the stroke management unit 2 to delete and move individual stroke data (Step 722). The following Step 723 under Rule 624 are identical with the steps for deleting the line group. When the editing is completed for the block group, the edit unit 9 reviews relations between the block groups (Step 725). Since the space between the block groups is to be left under Rule 602, deleting the block does not affect the other block groups as shown in FIG. 10C.

A block group is not edited in case of FIG. 10B; however, Rule 602 is applied in Step 715 when a block group is edited.

The rule for the movement of the to-be-edited group in FIG. 10A may be specified by the user or automatically judged by the system. The rules are related to the movement of the line group and character group within one block group in this embodiment; however, the movement of the line group within the block group and the movement of the character group within the line group may be ruled separately (hierarchically).

The block edit unit 9 deletes the spaces in the block group 302 caused by the editing by moving the remaining character groups to the left, while giving no affect to the location of the character groups within the other block groups located in the right or below the block group 302 as shown in FIG. 10C.

Within the block group 304, where characters are written vertically, the location of the character groups is arranged vertically; however, such arrangement does not give any affect to the block group 305 below.

As has been explained, having the group management unit 4, and block edit unit 9 for managing the changes of layout caused by deleting or inserting the stroke data within one block, the user can use the system as if he were scribbling on a pad because the post-edit handwritten data are arranged neatly.

THE GROUP ROTATION IN CASE OF ROTATION COMMAND

First Example

The operation of the group rotation unit 10 will be explained while referring to FIGS. 15A through 15C and the flowchart in FIG. 12. Assume that a block group 401, while consists of five character groups 402 through 406 "あいうえお" (a-i-u-e-o) and one figure group 407 as shown in FIG. 15A, is rotated clockwise for forty-five degree around the center of character group 402 "あ" (a) (FIG. 15B), and the for ninety degrees in the same direction so that the block group 401 is rearranged vertically (FIG. 15C).

To begin with, the center of the rotation, or the center of the character group 402 is computed (Step 801). Since the block group 401 includes the character groups 402 through 406 and figure group 407 (Step 802:yes), the group rotation unit 10 selects the character group 403 "い" (i) identified by the next pointer as the to-be-rotated group (Step 803).

The group rotation unit 10 computes the post-rotation center of the character group 403 (Step 804), and further computes the distance from the pre-rotation and post-

14 rotation center of the character group 403 (Step 805). The rotation unit 10 issues a command to the stroke management unit 2 to move the character group 403 based on the distance thus computed (Step 806), and notifies the change in the character group data caused by moving the character group 403 to the group management unit 4 to update the data therein (Step 807).

The above process is successively applied to the character groups 404 through 406 and figure group 407. When the figure group 407 is processed, the rotation unit 10 judges that there is no group to be rotated in the block group 401 (Step 802), and ends the editing (rotation) operation. As a result, the block group 401 is rotated as shown in FIGS. 15B and 15C when rotated for forty-five degrees and ninety degrees, respectively.

Second Example

Another operation of the group rotation unit 10 will be explained while referring to FIGS. 16A and 16B. Assume that a block group 410, which consists of seven word groups 411 through 417 as shown in FIG. 16A, is rotated clockwise for ninety degrees around the center of the word group 411 "Sunday" as shown in FIG. 16B.

To begin with, the fulcrum of the rotation, or center of the word group 411 is computed (Step 801). Since the block group 410 includes the word groups 411 through 417 (Step 802:yes), the group rotation unit 10 selects the word group 412 "Monday" identified by the next pointer as the group to be rotated (Step 803).

The group rotation unit 10 computes the post-rotation center of the word group 412 (Step 804), and computes the distance from the pre-rotation center to the post-rotation center of the word group 412 (Step 805). The group rotation unit 10 issues a command to the stroke management unit 2 to move the word group 412 based on the distance thus computed (Step 806). Subsequently, the group rotation unit 10 sends the change in the word group data caused by moving the word group 412 to update the data therein (Step 807).

The above process is successively applied to the word groups 413 through 417, and after the process of the word group 417, the group rotation unit 401 judges that there is no word or figures to be rotated in the block group 410 and ends the operation. As a result, the block group 410 is rotated as shown in FIG. 16B, re-arranging the word groups 411 through 417 vertically.

Typical figure editors change the legible direction of the character and figures as well. However, the group rotation unit in the present invention rotates the characters and figures in any direction while maintaining their legible direction. Since the data can be arranged in any direction, table columns can be aligned vertically, horizontally or in a reverse direction. In case of a language which can be written either vertically or horizontally, such as Japanese, the handwritten data can be flexibly arranged in either direction.

The group selection judgment unit 8 successively processes the hierarchies in the group data by recursive processing. However, when the number of the hierarchies of the group data are limited, the group data in one hierarchy may be processed at a time. For example, in editing a group consisting of two hierarchies block group and character group, the group selection judgment unit 8 may select the group to be edited according to the flowcharts shown in FIGS. 17A and 17B. The former details the selection of the block group to be edited, and the latter details the selection of the character groups within the block. Note that the block group referred herein means the line group.

The operation of the group selection judgment unit 8 will be explained while referring to the FIGS. 17A and 17B. Assume that the handwritten data shown in FIG. 14A are stored in and managed by the stroke management unit 2 and stroke group management unit 4, respectively. Also assume that the group is managed by the character groups and block group consisting of a plurality of characters, and that the to-be-edited group 208 shown in FIG. 14B has been already determined by the editing area determination unit 7.

To begin with, the group selection judgment unit 8 retrieves the block group 206 from the group management unit 4 (Step 1701), to examine whether the rectangle data of the block group 106 overlap on the editing area 208 (Step 1702). Since the former overlap on the latter, the group selection judgment unit 8 further checks whether the overlapping area is more than a predetermined ratio to the area of the block group 206 (Step 1703). In this embodiment, the ratio is predetermined as 90% and 50% for the line and character, respectively. Since the overlapping area is smaller than the predetermined ratio, the block group 206 is not selected, and the group selection judgment unit 8 issues a command to examine the character group within the block group 206 (Step 1706).

Accordingly, the character group 201 within the block group 206 is retrieved (Step 1706). Since the character group 201 entirely overlaps on the editing area 208 (Step 1708), and the overlapping area is more than the predetermined ratio (Step 1710), the group selection judgment unit 8 selects the character group 201 as the to-be-edited group (Step 1712).

Subsequently, the character group 202 within the block group 206 is retrieved (Step 1706). Since the character group 202 overlaps on the editing area 208 (Step 1708) and the overlapping area is more than 50% (Step 1710), the group selection judgment unit 8 selects the character group 202 as the to-be-edited group (Step 1712).

The character group 203 within the block group 206 is retrieved (Step 1706), and since the character group 203 does not overlap on the editing area 208 (Step 1708), the group selection judgment unit 8 does not select the character group 203 as the to-be-edited group (Step 1709).

The character groups 204 and 205 are judged not to be the to-be-edited groups in the same manner (Steps 1707 though 1709).

As a result, the character groups 201 and 202 alone are selected as the to-be-edited groups. Since the edit unit 6 has issued a "delete" command for the character groups 201 and 202, the stroke data for the two groups in the stroke management unit 2 are deleted.

If the block edit unit 9 has issued a command to delete the spaces in the block group caused by the editing, the location of the groups 203, 204 and 205 and the rectangle data of the block group 206 are updated as shown in FIG. 14C and managed by the group management unit 4 as shown in FIG. 14C.

When the editing area 208 considerably overlaps on the block group 206 as shown in FIG. 14D, the editing area determination unit 7 selects the block group 206 as the editing area, and the block group 206 is deleted completely.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A handwritten stroke data editing system comprising:
   group management means for managing group data and box data for each group, said group data representing strokes within one group, said box data representing a box that is circumscribed to each group, said group including at least two of a character group representing a handwritten character, a word group representing a handwritten word, a line group consisting of a plurality of handwritten characters and words, and a figure group representing a handwritten figure;
   gesture recognition means for recognizing an editing area based on a gesture inputted by means of a stylus, said stylus being furnished for said system, said input gesture being represented by the stroke data, said editing area including said stroke data; and
   to-be-edited group selection means for selecting a to-be-edited group by computing an overlapping area of the editing area and each box, said selected to-be-edited group having the overlapping area more than a predetermined ratio to an area of the box, and the predetermined ratio being different for the character group, word group, line group, and figure group, respectively.

2. The system of claim 1, wherein said to-be-edited group selection means includes:
   area computing means for computing the overlapping area of the editing area and each box;
   judgment means for judging whether the overlapping area computed by said area computing means exceeds the predetermined ratio corresponding to the character group, line group, word group, and figure group; and
   selection means for selecting groups whose box overlaps on the editing area more than the predetermined ratio corresponding to the character group, line group, word group, and figure group.

3. The system of claim 2, wherein said to-be-edited group selection means selects the character group, word group, line group, and figure group if they area included within the selected to-be-edited group according to a predetermined hierarchy.

4. The system of claim 1, wherein said gesture recognition means computes coordinates of two opposing vertices of a rectangle that is circumscribed to a gesture stroke, said coordinates representing the editing area.

5. The system of claim 4, wherein said to-be-edited group selection means includes:
   an area computing means for computing an overlapping area of the editing area and each box based on the two vertices represented by the box data for each group and two vertices coordinates specified by the editing area;
   judgment means for judging whether the overlapping area computed by said area computing means exceeds the predetermined ratio; and
   selection means for selecting groups whose box overlaps on the editing area more than the predetermined ratio.

6. The system of claim 5, wherein said judgment means judges a predetermined value representing an attribute for each hierarchy as the predetermined ratio.

7. The system of claim 6, wherein said to-be-edited group selection means includes:
   group retrieval means for retrieving the box data in all the groups based on said first pointer and said second pointer included in the group data,
   whereby said area computing means computes the overlapping area of the editing area and each retrieved box data successively.

17

8. A handwritten stroke data editing system comprising:

group management means for managing group data and box data for each group, said group data representing strokes within one group, said box data representing a box that is circumscribed to each group, said group including at least two of a character group representing a handwritten character, a word group representing a handwritten word, a line group consisting of a plurality of handwritten characters and words, a figure group representing a handwritten figure;

gesture recognition means for recognizing an editing area and manipulation commands to said editing area based on a gesture inputted by means of a stylus, said stylus being furnished for said system, said input gesture being represented by the stroke data, said editing area including said stroke data;

to-be-edited group selection means for selecting a to-be-edited group by computing an overlapping area of the editing area and each box, said selected to-be-edited group having the overlapping area more than a predetermined ratio to an area of the box, and the predetermined ratio being different for the character group, word group, line group, and figure group, respectively;

edit command generation means for generating an edit command for strokes in the selected group in a manner recognized by said gesture recognition means, and for generating an edit command to delete spaces between the groups caused by deleting the group if said edit command includes a delete command, and for generating an edit command to eliminate an overlap between the groups caused by inserting a group if said edit command includes an insert command; and edit means for editing strokes in both the selected and non-selected groups stored in said group management means according to the edit commands from said edit command generation means.

9. The system of claim 8, wherein said edit command generation means includes:

layout data hold means for holding layout data, said layout data indicating whether to leave spaces between the lines, words, and characters in each group stored in said group management means, and whether to allow an overlap on any other group; and generation means for generating a move command to move other groups successively when said layout data disallows the spaces between the groups caused by deleting a group, and for generating a move command to move the other groups successively not to allow an overlap on any other group.

10. The system of claim 9, wherein said to-be-edited group selection means includes:

area computing means for computing the overlapping area of the editing area and each box;

judgment means for judging whether the overlapping area computed by said area computing means exceeds the predetermined ratio; and selection means for selecting groups whose box overlaps on the editing area more than the predetermined ratio.

11. The system of claim 10, wherein said to-be-edited group selection means selects the character group, word group, line group, and figure group if they are included within the selected to-be-edited group according to a predetermined hierarchy.

12. The system of claim 1, wherein said edit command generation means includes:

18 layout data hold means for holding layout data, said layout data indicating whether to leave spaces between lower hierachial groups and whether to allow an overlap on any other group of same hierachy for each group managed by said group management means; and generation means for generating a move command to move other groups successively when said layout data disallows the spaces between the lower hierachial groups caused by deleting a group, and for generating a move command to move the other groups successively not to allow an overlap on any other group of same hierachy.

13. The system of claim 12, wherein said gesture recognition means computes coordinates of two opposing vertices of a rectangle that is circumscribed to a gesture stroke, said coordinates representing the editing area.

14. The system of claim 13, wherein said to-be-edited group selection means includes:

an area computing means for computing an overlapping area of the editing area and each box based on the two vertices represented by the box data for each group and two vertices coordinates specified by the editing area;

judgment means for judging whether the overlapping area computed by said area computing means exceeds the predetermined ratio; and selection means for selecting groups whose box overlaps on the editing area more than the predetermined ratio.

15. The system of claim 14, wherein said judgment means judges a predetermined value representing an attribute for each hierarchy as the predetermined ratio.

16. The system of claim 15, wherein said to-be-edited group selection means includes:

group retrieval means for retrieving the box data in all the groups based on said first pointer and said second pointer included in the group data, whereby said area computing means computes the overlapping area of the editing area and each retrieved box data successively.

17. A handwritten stroke data editing system comprising:

group management means for managing group data and box data for each group, said group data representing strokes within in one group, said box data representing a box that is circumscribed to each group, said group including at least two of a character group representing a handwritten character, a word group representing a handwritten word, a line group consisting of a plurality of handwritten characters and words, a figure group representing a handwritten figure;

gesture recognition means for recognizing an editing area and manipulation commands to said editing area based on a gesture inputted by means of a stylus, said stylus being furnished for said system, said input gesture being represented by the stroke data, said editing area including said stroke data;

to-be-edited group selection means for selecting a to-be-edited group by computing an overlapping area of the editing area and each box, said selected to-be-edited group having the overlapping area more than a predetermined ratio to an area of the box, and the predetermined ratio being different for the character group, word group, line group, and figure group, respectively;

rotation command generation means for generating an edit command to rotate the character and a figure within one group while maintaining their respective legible directions when the edit command for the selected to-be-edited group recognized by said gesture recognition means is a rotation command; and edit means for deleting strokes in the to-be-edited group and the groups within said to-be-edited group stored in said group management means according to the edit commands from said rotation command generation means.

18. The system of claim 21, wherein said rotation command generation means includes:

center coordinate computation means for computing a center of the selected to-be-edited group, around which the selected group is rotated;

sample coordinate computation means for computing a sample coordinate for each group within the selected to-be-edited group;

post-rotation coordinate computation means for computing a post-rotation sample coordinate for each group after the sample coordinate is rotated for a given degree;

distance computation means for computing a distance from the pre-rotation sample coordinate to the post-rotation sample coordinate for each group; and edit command generating means for generating an edit command to add the distance to the sample coordinate for each group.

19. The system of claim 18, wherein said to-be-edited group selection means includes:

area computing means for computing the overlapping area of the editing area and each box;

judgment means for judging whether the overlapping area computed by said area computing means exceeds the predetermined ratio; and selection means for selecting groups whose box overlaps on the editing area more than the predetermined ratio.

20. The system of claim 19, wherein said to-be-edited group selection means selects the character group, word group, line group, and figure group if they are included within the selected to-be-edited group according to a predetermined hierarchy.

21. The system of claim 1, wherein said rotation command generation means includes:

center coordinated computation means for computing a center of the selected to-be-edited group, around which the selected group is rotated;

sample coordinate computation means for computing a sample coordinate for each group within the selected to-be-edited group;

post-rotation coordinate computation means for computing a post-rotation sample coordinate for each group after the sample coordinate is rotated for a given degree;

distance computation means for computing a distance from the pre-rotation sample coordinate to the post-rotation sample coordinate for each group; and edit command generating means for generating an edit command to add the distance to the sample coordinate for each group.

22. The system of claim 21, wherein said sample coordinate computation means successively retrieves the groups in the selected group using said first pointer and said second pointer and computes the sample coordinate, said sample coordinate being a middle point of two vortices specified by data of each group.

23. The system of claim 22, wherein said gesture recognition means computes coordinates of two opposing vertices of a rectangle that is circumscribed to a gesture stroke, said coordinates representing the editing area.

24. The system of claim 23, wherein said to-be-edited group selection means includes:

an area computing means for computing an overlapping area of the editing area and each box based on the two vertices represented by the box data for each group and two vertices coordinates specified by the editing area;

judgment means for judging whether the overlapping area computed by said area computing means exceeds the predetermined ratio; and selection means for selecting groups whose box overlaps on the editing area more than the predetermined ratio.

25. The system of claim 24, wherein said judgment means judges a predetermined value representing an attribute for each hierarchy as the predetermined ratio.

26. The system of claim 25, wherein said to-be-edited group selection means includes:

group retrieval means for retrieving the box data in all the groups based on said first pointer and said second pointer included in the group data, whereby said area computing means computes the overlapping area of the editing area and each retrieved box data successively.

27. A handwritten stroke editing system comprising:

stylus means for inputting handwritten text and graphics into the system, said text and graphics including characters, words, lines of text, and figures, where words are comprised of characters and lines of text are comprised of words;

display means for displaying said handwritten text;

means for calculating an area of a box about each character, word, line of text, and figure input into the system;

means for entering editing gestures overlain on said display of said handwritten test for processing one of said character, word, line of text, or figure;

means for calculating an area to be edited based on said editing gestures;

first judging means for judging whether said area to be edited based on said editing gestures is common with two of said boxes about said characters, words, lines of text, and figures;

second judging means for judging, when said first judging means determines that there is a common area between said characters, words, lines of text, and figures and said area to be edited, which of said characters, words, lines of text, and figures is to be processed, said judging based on a predetermine hierarchy and a predetermined ratio of common area between said area to be edited and said boxes about each character, word, line of text, and figure, and where the predetermined ratio is different for characters, words, lines of text, and figures, respectively.

28. A handwritten stroke data editing system comprising:

group management means for managing group data and box data for each grup, said group data representing strokes within one group, said box data representing a box that is circumscribed to each group, said group including at least two of a character group representing a handwritten character, a word group representing a handwritten word, a line group consisting of a plurality of handwritten characters and words, and a figure group representing a handwritten figure, including:

stroke storage means for storing the stroke data representing a range of points data for a handwritten character stroke and a handwritten figure stroke;

group data storage means for storing group data, said group data including an attribute indicating a hierarchy of each group, a first pointer specifying a lower hierarchy group within one group, a second pointer specifying a group in a same hierarchy within the group, said attribute including at least one of character attribute identifying as being the character group, a word attribute identifying as being the word group, a line attribute identifying as being the line group, a paragraph attribute for identifying as being a paragraph group, and a block attribute identifying as being a block group, said first pointer in a last hierarchy group representing the stroke data composing the group; and box data storage means for storing box data for each group, said box data being composed of two opposing vertices of a rectangle that is circumscribed to the group;

gesture recognition means for recognizing an editing area based on a gesture inputted by means of a stylus, said stylus being furnished for said system, said input gesture being represented by the stroke data, said editing area including said stroke data; and to-be-edited group selection means for selecting a to-be-edited group by computing an overlapping area of the editing are and each box, said selected to-be-edited group by computing an overlapping area of the editing area and each box, said selected to-be-edited group having the overlapping are more than a predetermined ratio to an area of the box, and the predetermined are being different for the character group, word group, line group, and figure group, respectively.

29. A handwritten stroke data editing system comprising:

group management means for managing group data and box data for each group, said group data representing strokes within one group, said box data representing a box that is circumscribed to each group, said group including at least two of a character group representing a handwritten character, a word group representing a handwritten word, a line group consisting a plurality of handwritten characters and words, a figure group representing a handwritten figure, includes:

stroke storage means for storing the stroke data representing a range of points data for a handwritten character stroke and a handwritten figure stroke;

group data storage means for storing group data, said group data including an attribute indicating a hierarchy of each group, a first pointer specifying a lower hierarchy group within one group, a second pointer specifying a group in a same hierarchy within the group, said attribute including at least one of character attribute identifying as being the character group, a word attribute identifying to as being the word group, a line attribute identifying as being the line group, a paragraph attribute for identifying as being a paragraph group, and a block attribute identifying as being a block group, said first pointer in a last hierarchy group representing the stroke data composing the group; and box data storage means for storing box data for each group, said box data being composed of two opposing vertices of a rectangle that is circumscribed to the group;

gesture recognition means for recognizing an editing area and manipulation commands to said editing area based on a gesture inputted by means of a stylus, said stylus being furnished for said system, said input gesture being represented by the stroke data, said editing area including said stroke data;

to-be-edited group selection means for selecting a to-be-edited group by computing an overlapping area of the editing area and each box, said selected to-be-edited group having the overlapping area more than a predetermined ratio to an area of the box, and the predetermined ratio being different for the character group, word group, line group, and figure group, respectively;

edit command generation means for generating an edit command for strokes in the selected group in a manner recognized by said gesture recognition means, and for generating an edit command to delete spaces between the groups caused by deleting the group if said edit command includes a delete command, and for generating an edit command to eliminate an overlap between the groups caused by inserting a group if said edit command includes an insert command; and edit means for editing strokes in both the selected and non-selected groups stored in said group management means according to the edit commands from said edit command generation means.

30. A handwritten stroke data editing system comprising:

group management means for managing group data and box data for each group, said group data representing strokes within one group, said box data representing a box that is circumscribed to each group, said group including at least two of a character group representing a handwritten character, a word group representing a handwritten word, a line group consisting of a plurality of handwritten characters and words, a figure group representing a handwritten figure, includes:

stroke storage means for storing the stroke data representing a range of points data for a handwritten character stroke and a handwritten figure stroke;

group data storage means for storing group data, said group data including an attribute indicating a hierarchy of each group, a first pointer specifying a lower hierarchy group within one group, a second pointer specifying a group in a same hierarchy within the group, said attribute including at least one of character attribute identifying as being the character group, a word attribute identifying to as being the word group, a line attribute identifying as being the line group, a paragraph attribute for identifying as being a paragraph group, and a block attribute identifying as being a block group, said first pointer in a last hierarchy group representing the stroke data composing the group; and box data storage means for storing box data for each group, said box data being composed of two opposing vertices of a rectangle that is circumscribed to the group;

gesture recognition means for recognizing an editing area and manipulation commands to said editing area based on a gesture inputted by means of a stylus, said stylus being furnished for said system, said input gesture being represented by the stroke data, said editing area including said stroke data;

to-be-edited group selection means for selecting a to-be-edited group by computing an overlapping area of the editing area and each box, said selected to-be-edited group having the overlapping area more than a predetermined ratio to an area of the box, and the predetermined ratio being different for the character group, word group, line group, and figure group, respectively;

edit command generation means for generating an edit command for strokes in the selected group in a manner recognized by said gesture recognition means, and for generating an edit command to delete spaces between the groups caused by deleting the group if said edit command includes a delete command, and for generating an edit command to eliminate an overlap between the groups caused by inserting a group if said edit command includes an insert command; and edit means for editing strokes in both the selected and non-selected groups stored in said group management means according to the edit commands from said edit command generation means.

* * * * *